United States Patent
John Wilson et al.

(10) Patent No.: US 11,330,571 B2
(45) Date of Patent: May 10, 2022

(54) RANDOM ACCESS TECHNIQUES IN BEAMFORMED WIRELESS COMMUNICATIONS

(71) Applicant: QUALCOMM Incorporated, San Diego, CA (US)

(72) Inventors: Makesh Pravin John Wilson, San Diego, CA (US); Tao Luo, San Diego, CA (US); Muhammad Nazmul Islam, Littleton, MA (US); Hung Dinh Ly, San Diego, CA (US); Heechoon Lee, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 16/544,114

(22) Filed: Aug. 19, 2019

(65) Prior Publication Data

US 2020/0059922 A1    Feb. 20, 2020

Related U.S. Application Data

(60) Provisional application No. 62/720,106, filed on Aug. 20, 2018.

(51) Int. Cl.
*H04W 72/04* (2009.01)
*H04W 74/00* (2009.01)
(Continued)

(52) U.S. Cl.
CPC ....... *H04W 72/0413* (2013.01); *H04L 5/0053* (2013.01); *H04W 72/046* (2013.01); *H04W 74/004* (2013.01); *H04W 74/0833* (2013.01)

(58) Field of Classification Search
None
See application file for complete search history.

(56) References Cited

U.S. PATENT DOCUMENTS

2018/0027594 A1* 1/2018 Nagaraja ............ H04B 7/0695
                                                                370/329
2018/0138962 A1* 5/2018 Islam .................. H04L 5/0032
(Continued)

FOREIGN PATENT DOCUMENTS

WO    WO-2018022470 A1    2/2018

OTHER PUBLICATIONS

U.S. Appl. No. 62/578,039, filed Oct. 27, 2017 (Year: 2017).*
International Search Report and Written Opinion—PCT/US2019/047301—ISA/EPO—dated Oct. 31, 2019.

*Primary Examiner* — Jeffrey M Rutkowski
*Assistant Examiner* — Basil Ma
(74) *Attorney, Agent, or Firm* — Holland & Hart LLP

(57) ABSTRACT

Methods, systems, and devices for wireless communications are described that provide for selection of different sets of transmission beams by a user equipment (UE) for establishing beamformed communications with a base station. Each transmission beam of a first set of transmission beams may have corresponding uplink random access channel (RACH) resources. A UE may monitor for transmission beams from a base station and select a first transmission beam of the first set for communications with the base station. As part of a connection establishment, the base station may provide configuration information that indicates a second set of transmission beams that includes each transmission beam of the first set of transmission beams and at least an additional transmission beam. In some cases, the additional transmission beam may be mapped to a first RACH resource that also corresponds to a first transmission beam of the first set of transmission beams.

30 Claims, 17 Drawing Sheets

(51) Int. Cl.
*H04L 5/00* (2006.01)
*H04W 74/08* (2009.01)

(56) References Cited

U.S. PATENT DOCUMENTS

2018/0176949 A1  6/2018  Islam et al.
2020/0275479 A1* 8/2020  Peisa .................. H04W 74/008

* cited by examiner

RANDOM ACCESS TECHNIQUES IN BEAMFORMED WIRELESS COMMUNICATIONS

CROSS REFERENCE

The present Application for Patent claims the benefit of U.S. Provisional Patent Application No. 62/720,106 by JOHN WILSON, et al., entitled "RANDOM ACCESS TECHNIQUES IN BEAMFORMED WIRELESS COMMUNICATIONS," filed Aug. 20, 2018, assigned to the assignee hereof, and expressly incorporated herein.

BACKGROUND

The following relates generally to wireless communications, and more specifically to random access techniques in beamformed wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, wireless devices (e.g., base stations, UEs, etc.) may use beamformed signals for transmission and/or reception of wireless communications. For example, a base station may utilize beamformed (or precoded) transmissions to provide directional transmissions that may mitigate path losses that may be experienced by non-beamformed transmissions which may have a relatively wide beam or omnidirectional transmission pattern. In some cases, a base station may transmit a number of consecutive beams in a beam sweep procedure, and one or more UEs may measure received signals to identify a preferred beam for communications. In some cases, random access channel (RACH) resources for initiating system access may be partitioned such that different beams are associated with different RACH resource partitions. A UE, upon determining a preferred beam, may transmit a random access request using RACH resources associated with the preferred beam, and a base station receiving the random access request may identify the preferred beam based on the RACH resources used to transmit the random access request. Efficient techniques for performing such random access based on a preferred beam with relatively little delay and relatively low signaling overhead would be desirable in order to help enhance reliability and efficiency of a network utilizing beamforming.

SUMMARY

The described techniques relate to improved methods, systems, devices, and apparatuses that support random access in beamformed wireless communications. Various described techniques provide for different sets of transmission beams that may be selected by a user equipment (UE) for establishing beamformed communications with a base station. In some cases, each transmission beam of a first set of transmission beams may have corresponding uplink random access channel (RACH) resources. A UE may monitor for transmission beams from a base station and select a first transmission beam of the first set of transmission beams for communications with the base station. As part of a connection establishment, the base station may provide configuration information that indicates the second set of transmission beams, where the second set of transmission beams includes each transmission beam of the first set of transmission beams and at least an additional transmission beam. In some cases, the additional transmission beam may be mapped to a first RACH resource that also corresponds to a first transmission beam of the first set of transmission beams. In some cases, the configuration information may be provided to the UE from a different base station (e.g., a different base station that provided non-beamformed communications with the UE in a non-stand-alone (NSA) deployment).

In some cases, the UE may select the additional transmission beam for communications with the base station, and may transmit a random access request using the first RACH resource. The base station may transmit a random access response back to the UE, and the UE may then transmit a connection request message that indicates that the UE has selected the additional transmission beam for communications. In some cases, the first set of transmission beams may be identified based on a set of synchronization signal blocks (SSBs) that are configured for transmitting system information and reference signals for initial system access and that each have corresponding RACH resources. The second set of transmission beams may be identified based on additional system information provided by the base station, and additional beams of the second set of transmission beams may not have corresponding dedicated RACH resources.

A method of wireless communication is described. The method may include identifying a first set of transmission beams to monitor for system information of a base station, identifying a first set of random access resources for transmission of a random access request to the base station, the first set of random access resources including a first random access resource that is associated with a first transmission beam of the first set of transmission beams, transmitting a first random access request to the base station using the first random access resource to initiate a connection establishment with the base station, receiving configuration information that indicates a second set of transmission beams, where the second set of transmission beams includes each transmission beam of the first set of transmission beams and at least an additional transmission beam, and mapping the additional transmission beam to at least the first random access resource.

An apparatus for wireless communication is described. The apparatus may include a processor, memory in electronic communication with the processor, and instructions stored in the memory. The instructions may be executable by the processor to cause the apparatus to identify a first set of transmission beams to monitor for system information of a base station, identify a first set of random access resources for transmission of a random access request to the base station, the first set of random access resources including a first random access resource that is associated with a first transmission beam of the first set of transmission beams, transmit a first random access request to the base station using the first random access resource to initiate a connection establishment with the base station, receive configuration information that indicates a second set of transmission beams, where the second set of transmission beams includes each transmission beam of the first set of transmission beams and at least an additional transmission beam, and map the additional transmission beam to at least the first random access resource.

Another apparatus for wireless communication is described. The apparatus may include means for identifying a first set of transmission beams to monitor for system information of a base station, identifying a first set of random access resources for transmission of a random access request to the base station, the first set of random access resources including a first random access resource that is associated with a first transmission beam of the first set of transmission beams, transmitting a first random access request to the base station using the first random access resource to initiate a connection establishment with the base station, receiving configuration information that indicates a second set of transmission beams, where the second set of transmission beams includes each transmission beam of the first set of transmission beams and at least an additional transmission beam, and mapping the additional transmission beam to at least the first random access resource.

A non-transitory computer-readable medium storing code for wireless communication is described. The code may include instructions executable by a processor to identify a first set of transmission beams to monitor for system information of a base station, identify a first set of random access resources for transmission of a random access request to the base station, the first set of random access resources including a first random access resource that is associated with a first transmission beam of the first set of transmission beams, transmit a first random access request to the base station using the first random access resource to initiate a connection establishment with the base station, receive configuration information that indicates a second set of transmission beams, where the second set of transmission beams includes each transmission beam of the first set of transmission beams and at least an additional transmission beam, and map the additional transmission beam to at least the first random access resource.

In some examples of the method, apparatuses, and non-transitory computer-readable medium described herein, the identifying the first set of transmission beams further may include operations, features, means, or instructions for receiving a remaining minimum system information (RMSI) transmission from the base station that indicates the first set of transmission beams, and where the first set of random access resources may be determined based on the first set of transmission beams. In some examples of the method, apparatuses, and non-transitory computer-readable medium described herein, the receiving the configuration information further may include operations, features, means, or instructions for receiving additional system information indicating that the additional transmission beam that may be available for communications with the base station. In some examples of the method, apparatuses, and non-transitory computer-readable medium described herein, the receiving the configuration information further may include operations, features, means, or instructions for receiving an indication of a mapping between the first set of random access resources and the additional transmission beam. In some examples of the method, apparatuses, and non-transitory computer-readable medium described herein, the indication of the mapping may be received in one or more of RMSI from the base station, or RRC signaling from the base station.

In some examples of the method, apparatuses, and non-transitory computer-readable medium described herein, the indication of the mapping includes an explicit indication of a correspondence between each additional transmission beam and a random access resource of the first set of random access resources, or an index value of a predefined indexed set of mappings.

In some examples of the method, apparatuses, and non-transitory computer-readable medium described herein, the mapping the additional transmission beam to at least the first random access resource may include operations, features, means, or instructions for determining that the first transmission beam of the first set of transmission beams has a first set of beamforming parameters that are closer to a second set of beamforming parameters of the additional transmission beam than other transmission beams of the first set of transmission beams.

A method of wireless communication is described. The method may include transmitting a first random access request to a base station using a first random access resource to initiate a connection establishment with the base station, the first random access resource associated with a first transmission beam of a first set of transmission beams for monitoring system information of the base station, receiving, based on the connection establishment, configuration information that indicates a second set of transmission beams, where the second set of transmission beams includes each transmission beam of the first set of transmission beams and at least an additional transmission beam, and transmitting a second random access request to the base station based on the additional transmission beam, where the second random access request uses the first random access resource.

An apparatus for wireless communication is described. The apparatus may include a processor, memory in electronic communication with the processor, and instructions stored in the memory. The instructions may be executable by the processor to cause the apparatus to transmit a first random access request to a base station using a first random access resource to initiate a connection establishment with the base station, the first random access resource associated with a first transmission beam of a first set of transmission beams for monitoring system information of the base station, receive, based on the connection establishment, configuration information that indicates a second set of transmission beams, where the second set of transmission beams includes each transmission beam of the first set of transmission beams and at least an additional transmission beam, and transmit a second random access request to the base station based on the additional transmission beam, where the second random access request uses the first random access resource.

Another apparatus for wireless communication is described. The apparatus may include means for transmitting a first random access request to a base station using a first random access resource to initiate a connection establishment with the base station, the first random access resource associated with a first transmission beam of a first set of transmission beams for monitoring system information of the base station, receiving, based on the connection establishment, configuration information that indicates a second set of transmission beams, where the second set of transmission beams includes each transmission beam of the first set of transmission beams and at least an additional transmission beam, and transmitting a second random access request to the base station based on the additional transmission beam, where the second random access request uses the first random access resource.

A non-transitory computer-readable medium storing code for wireless communication is described. The code may include instructions executable by a processor to transmit a first random access request to a base station using a first random access resource to initiate a connection establishment with the base station, the first random access resource associated with a first transmission beam of a first set of transmission beams for monitoring system information of the base station, receive, based on the connection establishment, configuration information that indicates a second set of transmission beams, where the second set of transmission beams includes each transmission beam of the first set of transmission beams and at least an additional transmission beam, and transmit a second random access request to the base station based on the additional transmission beam, where the second random access request uses the first random access resource.

Some examples of the method, apparatuses, and non-transitory computer-readable medium described herein may further include operations, features, means, or instructions for monitoring for a random access response to the second random access request on resources associated with each of the first transmission beam and the additional transmission beam. Some examples of the method, apparatuses, and non-transitory computer-readable medium described herein may further include operations, features, means, or instructions for transmitting a third random access message to the base station responsive to the random access response, the third random access message identifying the additional transmission beam may be to be used for communications. Some examples of the method, apparatuses, and non-transitory computer-readable medium described herein may further include operations, features, means, or instructions for receiving a fourth random access message from the base station via the additional transmission beam.

A method of wireless communication is described. The method may include identifying a set of system synchronization blocks (SSBs) to monitor for system information of a base station, the set of SSBs including a first subset of SSBs and a second subset of SSBs, identifying a first random access resource that is associated with both a first SSB of the first subset of SSBs and a second SSB of the second subset of SSBs, determining to communicate with the base station using a second transmission beam associated with the second SSB, transmitting a random access request to a base station using the first random access resource, and transmitting an indication to the base station that the second transmission beam is to be used for communications.

An apparatus for wireless communication is described. The apparatus may include a processor, memory in electronic communication with the processor, and instructions stored in the memory. The instructions may be executable by the processor to cause the apparatus to identify a set of system synchronization blocks (SSBs) to monitor for system information of a base station, the set of SSBs including a first subset of SSBs and a second subset of SSBs, identify a first random access resource that is associated with both a first SSB of the first subset of SSBs and a second SSB of the second subset of SSBs, determine to communicate with the base station using a second transmission beam associated with the second SSB, transmit a random access request to a base station using the first random access resource, and transmit an indication to the base station that the second transmission beam is to be used for communications.

Another apparatus for wireless communication is described. The apparatus may include means for identifying a set of system synchronization blocks (SSBs) to monitor for system information of a base station, the set of SSBs including a first subset of SSBs and a second subset of SSBs, identifying a first random access resource that is associated with both a first SSB of the first subset of SSBs and a second SSB of the second subset of SSBs, determining to communicate with the base station using a second transmission beam associated with the second SSB, transmitting a random access request to a base station using the first random access resource, and transmitting an indication to the base station that the second transmission beam is to be used for communications.

A non-transitory computer-readable medium storing code for wireless communication is described. The code may include instructions executable by a processor to identify a set of system synchronization blocks (SSBs) to monitor for system information of a base station, the set of SSBs including a first subset of SSBs and a second subset of SSBs, identify a first random access resource that is associated with both a first SSB of the first subset of SSBs and a second SSB of the second subset of SSBs, determine to communicate with the base station using a second transmission beam associated with the second SSB, transmit a random access request to a base station using the first random access resource, and transmit an indication to the base station that the second transmission beam is to be used for communications.

Some examples of the method, apparatuses, and non-transitory computer-readable medium described herein may further include operations, features, means, or instructions for monitoring for a random access response to the second random access request on resources associated with each of a first transmission beam associated with the first random access resource and the second transmission beam. In some examples of the method, apparatuses, and non-transitory computer-readable medium described herein, the transmitting the indication to the base station may include operations, features, means, or instructions for transmitting a second random access message to the base station responsive to the random access response, the second random access message identifying the second transmission beam may be to be used for communications. In some examples of the method, apparatuses, and non-transitory computer-readable medium described herein, the second random access message may be a message three (MSG3) transmission in a random access procedure. Some examples of the method, apparatuses, and non-transitory computer-readable medium described herein may further include operations, features, means, or instructions for communicating with the base station via the second transmission beam.

A method of wireless communication is described. The method may include configuring a first set of transmission beams for transmission of system information to at least a first UE for initial system access, and a first set of random access resources for transmission of random access requests by one or more UEs, the first set of random access resources including a first random access resource that is associated with a first transmission beam of the first set of transmission beams, receiving a first random access request from the first UE using the first random access resource to initiate a connection establishment with the base station, transmitting, during the connection establishment, configuration information that indicates a second set of transmission beams, where the second set of transmission beams includes each transmission beam of the first set of transmission beams and at least a second transmission beam in addition to the first set of transmission beams, and mapping the second transmission beam to at least the first random access resource.

An apparatus for wireless communication is described. The apparatus may include a processor, memory in electronic communication with the processor, and instructions stored in the memory. The instructions may be executable by the processor to cause the apparatus to configure a first set of transmission beams for transmission of system information to at least a first UE for initial system access, and a first set of random access resources for transmission of random access requests by one or more UEs, the first set of random access resources including a first random access resource that is associated with a first transmission beam of the first set of transmission beams, receive a first random access request from the first UE using the first random access resource to initiate a connection establishment with the base station, transmit, during the connection establishment, configuration information that indicates a second set of transmission beams, where the second set of transmission beams includes each transmission beam of the first set of transmission beams and at least a second transmission beam in addition to the first set of transmission beams, and map the second transmission beam to at least the first random access resource.

Another apparatus for wireless communication is described. The apparatus may include means for configuring a first set of transmission beams for transmission of system information to at least a first UE for initial system access, and a first set of random access resources for transmission of random access requests by one or more UEs, the first set of random access resources including a first random access resource that is associated with a first transmission beam of the first set of transmission beams, receiving a first random access request from the first UE using the first random access resource to initiate a connection establishment with the base station, transmitting, during the connection establishment, configuration information that indicates a second set of transmission beams, where the second set of transmission beams includes each transmission beam of the first set of transmission beams and at least a second transmission beam in addition to the first set of transmission beams, and mapping the second transmission beam to at least the first random access resource.

A non-transitory computer-readable medium storing code for wireless communication is described. The code may include instructions executable by a processor to configure a first set of transmission beams for transmission of system information to at least a first UE for initial system access, and a first set of random access resources for transmission of random access requests by one or more UEs, the first set of random access resources including a first random access resource that is associated with a first transmission beam of the first set of transmission beams, receive a first random access request from the first UE using the first random access resource to initiate a connection establishment with the base station, transmit, during the connection establishment, configuration information that indicates a second set of transmission beams, where the second set of transmission beams includes each transmission beam of the first set of transmission beams and at least a second transmission beam in addition to the first set of transmission beams, and map the second transmission beam to at least the first random access resource.

Some examples of the method, apparatuses, and non-transitory computer-readable medium described herein may further include operations, features, means, or instructions for transmitting a synchronization system block (SSB) using each transmission beam of the first set of transmission beams, the SSB including remaining minimum system information (RMSI) that indicates the first set of transmission beams, and where the first set of random access resources may be determined based on the first set of transmission beams. In some examples of the method, apparatuses, and non-transitory computer-readable medium described herein, the transmitting the configuration information further may include operations, features, means, or instructions for transmitting additional system information to the first UE indicating one or more additional transmission beams, in addition to the first set of transmission beams, may be available for communications. In some examples of the method, apparatuses, and non-transitory computer-readable medium described herein, the transmitting the configuration information further may include operations, features, means, or instructions for transmitting an indication of a mapping between the first set of random access resources and the one or more additional transmission beams. In some examples of the method, apparatuses, and non-transitory computer-readable medium described herein, the indication of the mapping includes an explicit indication of a correspondence between each of the additional transmission beams and a random access resource of the first set of random access resources, or an index value of a predefined indexed set of mappings.

Some examples of the method, apparatuses, and non-transitory computer-readable medium described herein may further include operations, features, means, or instructions for receiving a second random access request from the first UE using the first random access resource. Some examples of the method, apparatuses, and non-transitory computer-readable medium described herein may further include operations, features, means, or instructions for transmitting a random access response to the second random access request using each of the first transmission beam and the second transmission beam. Some examples of the method, apparatuses, and non-transitory computer-readable medium described herein may further include operations, features, means, or instructions for receiving a third random access message from the first UE responsive to the random access response, the third random access message identifying the second transmission beam may be to be used for communications. Some examples of the method, apparatuses, and non-transitory computer-readable medium described herein may further include operations, features, means, or instructions for transmitting a fourth random access message from the base station via the second transmission beam.

A method of wireless communication is described. The method may include configuring a set of system synchronization blocks (SSBs) for transmission of system information to at least a first UE, the set of SSBs including a first subset of SSBs and a second subset of SSBs, identifying a first random access resource that is associated with both a first SSB of the first subset of SSBs and a second SSB of the second subset of SSBs, receiving a random access request from the first UE via the first random access resource, and receiving, subsequent to receiving the random access request, an indication from the first UE that a second transmission beam associated with the second SSB is to be used for communications with the first UE.

An apparatus for wireless communication is described. The apparatus may include a processor, memory in electronic communication with the processor, and instructions stored in the memory. The instructions may be executable by the processor to cause the apparatus to configure a set of system synchronization blocks (SSBs) for transmission of system information to at least a first UE, the set of SSBs including a first subset of SSBs and a second subset of SSBs, identify a first random access resource that is associated with both a first SSB of the first subset of SSBs and a second SSB of the second subset of SSBs, receive a random access request from the first UE via the first random access resource, and receive, subsequent to receiving the random access request, an indication from the first UE that a second transmission beam associated with the second SSB is to be used for communications with the first UE.

Another apparatus for wireless communication is described. The apparatus may include means for configuring a set of system synchronization blocks (SSBs) for transmission of system information to at least a first UE, the set of SSBs including a first subset of SSBs and a second subset of SSBs, identifying a first random access resource that is associated with both a first SSB of the first subset of SSBs and a second SSB of the second subset of SSBs, receiving a random access request from the first UE via the first random access resource, and receiving, subsequent to receiving the random access request, an indication from the first UE that a second transmission beam associated with the second SSB is to be used for communications with the first UE.

A non-transitory computer-readable medium storing code for wireless communication is described. The code may include instructions executable by a processor to configure a set of system synchronization blocks (SSBs) for transmission of system information to at least a first UE, the set of SSBs including a first subset of SSBs and a second subset of SSBs, identify a first random access resource that is associated with both a first SSB of the first subset of SSBs and a second SSB of the second subset of SSBs, receive a random access request from the first UE via the first random access resource, and receive, subsequent to receiving the random access request, an indication from the first UE that a second transmission beam associated with the second SSB is to be used for communications with the first UE.

Some examples of the method, apparatuses, and non-transitory computer-readable medium described herein may further include operations, features, means, or instructions for transmitting a random access response to the second random access request each of a first transmission beam associated with the first SSB and the second transmission beam. In some examples of the method, apparatuses, and non-transitory computer-readable medium described herein, the receiving the indication may include operations, features, means, or instructions for receiving a second random access message from the first UE responsive to the random access response, the second random access message identifying that the second transmission beam may be to be used for communications. In some examples of the method, apparatuses, and non-transitory computer-readable medium described herein, the second random access message may be a message three (MSG3) transmission in a random access procedure. Some examples of the method, apparatuses, and non-transitory computer-readable medium described herein may further include operations, features, means, or instructions for communicating with the first UE via the second transmission beam.

DETAILED DESCRIPTION

Figure 1:
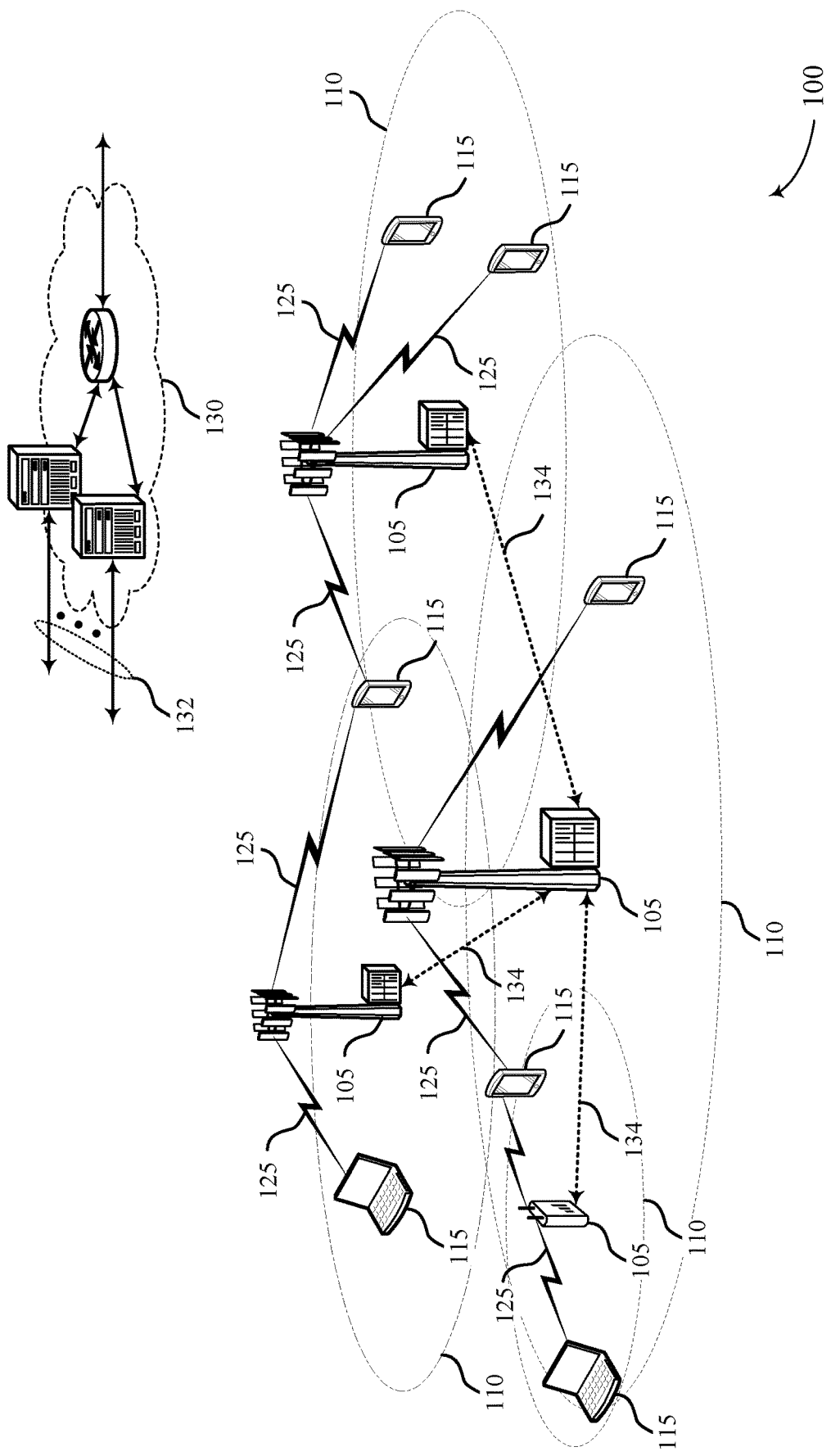
FIG. 1 illustrates an example of a system for wireless communications that supports random access techniques in beamformed wireless communications in accordance with aspects of the present disclosure.

Various aspects of the present disclosure relate to methods, systems, devices, and apparatuses that support random access in beamformed wireless communications. In some cases, different sets of transmission beams may be used by a user equipment (UE) for establishing beamformed communications with a base station. The different sets of transmission beams may include a first set of transmission beams for initial access that each have corresponding random access channel (RACH) resources and a second set of transmission beams that do not have corresponding RACH resources. In some cases, a UE may request access via a transmission beam of the second set of transmission beams by sending a random access request using RACH resources that are mapped to a transmission beam of the first set of transmission beams. The UE, in some cases, may indicate to the base station that the transmission beam of the second set has been selected as part of random access signaling.

For example, a base station may transmit a number of synchronization system blocks (SSBs) that may include system information (e.g., in remaining minimum system information (RMSI)) for initial system access. The system information may indicate, for example, a first set of SSBs (e.g., a set 'N1' of SSBs) that are configured to be monitored for initial system access, where each SSB corresponds to a transmission beam that is used to transmit the SSB. Further, each SSB of the first set of SSBs may have corresponding RACH resources that a UE may use to transmit a random access request to the base station. Thus, based on the particular RACH resources used for the random access request, the base station may determine which SSB and associated beam the UE is requesting for communications.

In some cases, a second set of SSBs (e.g., a set N2 of SSBs) may be configured when the UE establishes a connection with the base station, and the first set of SSBs and the second set of SSBs may not include the same SSBs. In some cases, the first set of SSBs is a subset of the second set of SSBs. In some cases, based on measurement of different SSB transmissions, a UE may request access via a transmission beam associated with the second set of SSBs directly in a random access procedure. As indicated, in some cases one or more additional SSBs of the second set of SSBs may be mapped to RACH resources of a SSB of the first set of SSBs. The UE may transmit a random access request using the mapped RACH resources. The base station may recognize that the mapped RACH resources may contain a random access request associated with two (or more) SSBs, and the UE may signal which of the SSBs is selected in a subsequent RACH transmission (e.g., in a MSG3 transmission). Based on the indicated selection, the base station may establish communications using the selected transmission beam, which may provide enhanced robustness and performance of the wireless communications. Such techniques may also allow UEs to efficiently and quickly perform random access to establish communications via a relatively high quality beam, and may reduce overhead associated with further beam refinement procedures.

Aspects of the disclosure are initially described in the context of a wireless communications system. Aspects of the disclosure are further illustrated by and described with reference to apparatus diagrams, system diagrams, and flowcharts that relate to uplink timing adjustment in beamformed wireless communications.

FIG. 1 illustrates an example of a wireless communications system 100 that supports random access techniques in beamformed wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these.

Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

In some cases that utilize beamforming between base stations 105 and UEs 115, different sets of transmission beams may be used for establishing beamformed communications. The different sets of transmission beams may include a first set of transmission beams for initial access that each have corresponding RACH resources and a second set of transmission beams that do not have corresponding RACH resources. In some cases, a UE 115 may request access via a transmission beam of the second set of transmission beams by sending a random access request using RACH resources that are mapped to a transmission beam of the first set of transmission beams. The UE 115, in some cases, may indicate to the base station 105 that the transmission beam of the second set has been selected as part of random access signaling. For example, the UE 115 may indicate in a RRC establishment request (e.g., a MSG3 in a random access procedure such as used in LTE and NR) that the transmission beam of the second set of transmission beams is selected.

Figure 2:
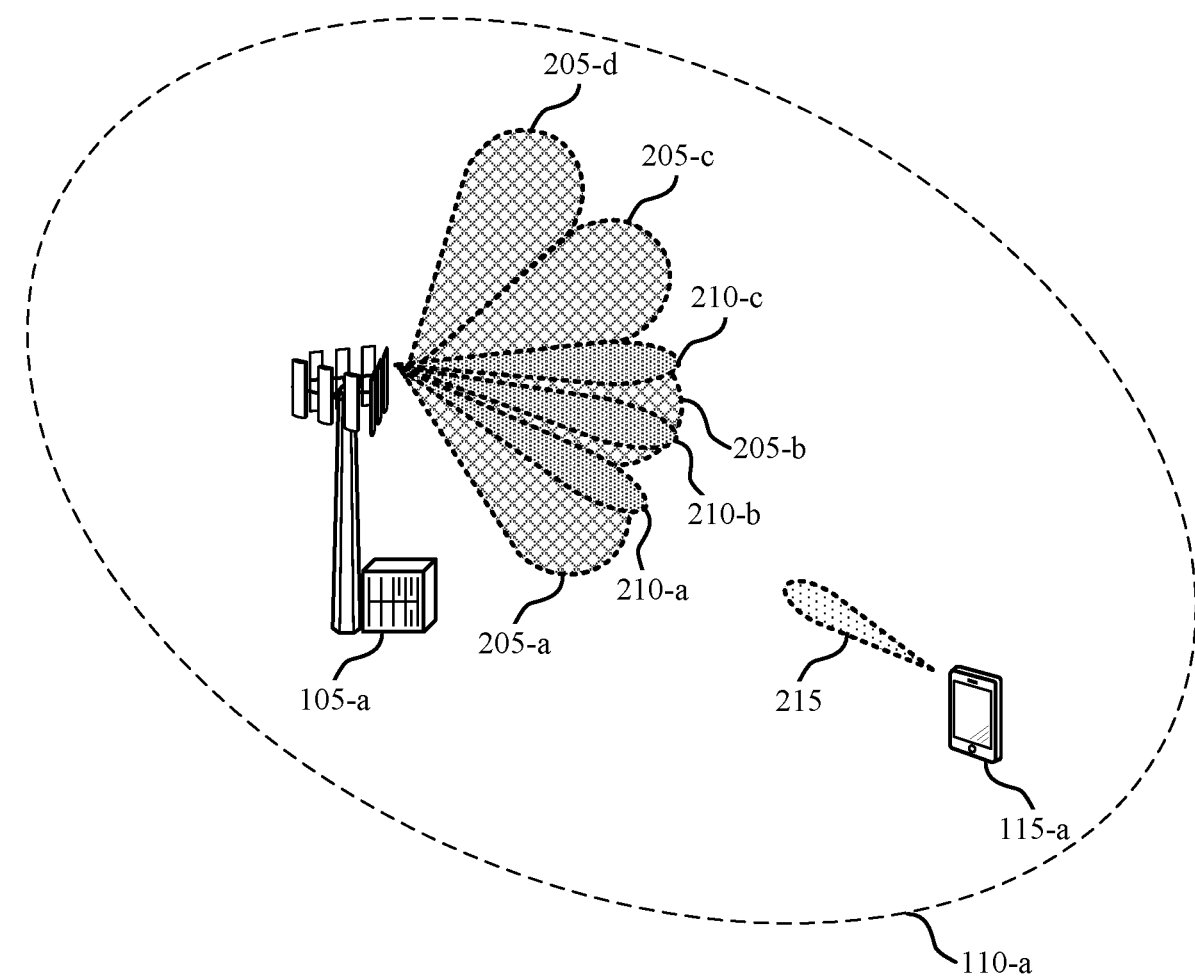
FIG. 2 illustrates an example of a portion of a wireless communications system that supports random access techniques in beamformed wireless communications in accordance with aspects of the present disclosure.

FIG. 2 illustrates an example of a wireless communications system 200 that supports random access techniques in beamformed wireless communications in accordance with aspects of the present disclosure. In some examples, wireless communications system 200 may implement aspects of wireless communication system 100. The wireless communications system 200 may include base station 105-a and UE 115-a, which may be examples of a base station 105 and a UE 115, as described with reference to FIG. 1. Base station 105-a may provide network coverage for geographic area 110-a. Base station 105-a and UE 115-a may communicate using beamformed or directional transmissions.

As indicated above, in some cases base station 105-a may transmit a number of consecutive beams in a beam sweep procedure, and UE 115-a may measure received signals to identify a preferred beam for communications. As indicated above, in some cases RACH resources for initiating system access may be partitioned such that different beams are associated with different RACH resource partitions. The UE 115-a, upon determining a preferred beam, may transmit a random access request using RACH resources associated with the preferred beam, and the base station 105-a may receive the random access request and identify the preferred beam based on the RACH resources used to transmit the random access request.

In the example of FIG. 2, the base station 105-a may transmit initial access beams 205 in a beam sweep procedure, where each of the initial access beams 205 have a corresponding SSB. The SSB transmissions may include system information (e.g., in remaining minimum system information (RMSI)) for initial system access. The system information may indicate, for example, a first set of SSBs (e.g., a set 'N1' of SSBs) that are configured to be monitored for initial system access, where each SSB corresponds to a transmission beam 205 that is used to transmit the SSB. Further, each SSB of the first set of SSBs may have a corresponding RACH resources that the UE 115-a may use to transmit a random access request to the base station 105-a. Thus, based on the particular RACH resources used for the random access request, the base station 105-a may determine which SSB and associated beam the UE 115-a is requesting for communications.

In some cases, a second set of SSBs (e.g., a set N2 of SSBs) may be configured when the UE 115-a establishes a connection with the base station 105-a, and the first set of SSBs and the second set of SSBs may not include the same SSBs. The second set of SSBs may be transmitted using one or more additional beams 210. Such additional beams 210 may provide beam refinement or coverage enhancement. In some cases, the first set of SSBs is a subset of the second set of SSBs. In some cases, based on measurement of different SSB transmissions, a UE 115-a may request access via a transmission beam associated with the second set of SSBs directly in a random access procedure, such as via uplink beam 215 and one of the additional beams 210-a. As indicated, in some cases one or more additional SSBs of the second set of SSBs may be mapped to RACH resources of a SSB of the first set of SSBs. The UE 115-a may transmit the random access request using the mapped RACH resources. The base station 105-a may recognize that the mapped RACH resources may contain a random access request associated with two (or more) SSBs, and the UE 115-a may signal which of the SSBs is selected in a subsequent RACH transmission (e.g., in a MSG3 transmission). Based on the indicated selection, the base station 105-a may establish communications using the selected transmission beam. Such association of additional beams 210 with RACH resources of the initial access beams 205 may be similar to specifying a quasi-co-location (QCL) relation between the additional beams 210 (e.g., the subset of beams corresponding to N2-N1) and the initial access beams 205.

In some cases, the mapping between RACH resources associated with the additional beams 210 and the initial access beams 205 may be provided in system information transmitted as part of a connection establishment (e.g., in a RMSI/SIB1 transmission that indicates additional system information). In some cases, mapping may be predefined and specified. In some cases, a number of mappings may be predefined in an indexed set of mappings, and the base station 105-a may signal an index value to the UE 115-a to indicate which mapping to use. In other cases, dedicated signaling may explicitly indicate the mapping. In some cases, the UE 115-a may identify the RACH resources for an additional beam 210 based on which beam of the initial access beams 205 is closest to the additional beam 210 (i.e., which of the initial access beams 205 has beamforming parameters that are most similar to the selected additional beam 210). The UE 115-a may then select the RACH resources that correspond to the closest initial access beam 205 for a random access request.

In some cases, the indication of the initial access beams 205 may be provided in one or more bitmaps that indicate which of 64 potential SSBs (and associated transmission beams) are used for initial access (e.g., via ssb-PositionsIn-Burst bitmaps provided in a system information block (SIB) within a SSB). Following, or as part of, the connection establishment, the base station 105-a may indicate a number of additional SSBs that correspond to additional beams 210. For example, the base station 105-a may provide a full 64-bit bitmap that indicates all SSBs used for downlink transmission beams (e.g., via a ServingCellConfigCommon bitmap provided as additional system information in a connection establishment). As discussed above, RACH resources may be configured only for the initial access beams 205, and a mapping as discussed above may be used to determine RACH resources to use for a random access request for one of the additional beams 210. In some other cases, where some SSBs do not have associated RACH resources, the UE may select only the SSB having associated RACH resources for a random access request transmission.

Figure 3:
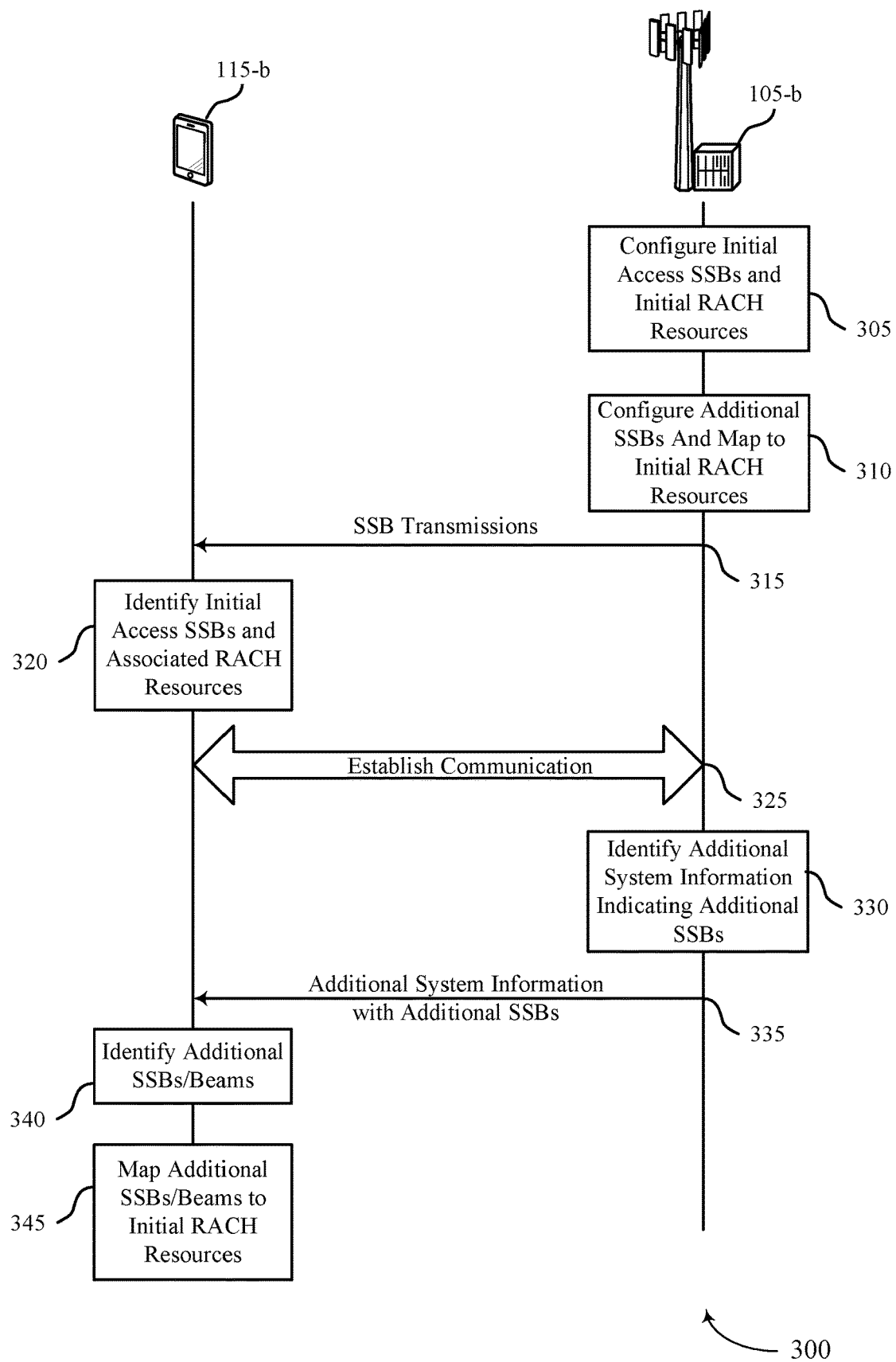
FIG. 3 illustrates an example of a process flow that supports random access techniques in beamformed wireless communications in accordance with aspects of the present disclosure.

FIG. 3 illustrates an example of a process flow 300 that supports random access techniques in beamformed wireless communications in accordance with aspects of the present disclosure. In some examples, process flow 300 may implement aspects of wireless communication system 100. Process flow 300 includes a UE 115-b and a base station 105-b, which may be respective examples of a UE 115 and a base station 105 as described with reference to FIGS. 1 and 2.

At 305, the base station 105-b may configure initial access SSBs and initial RACH resources that are associated with the initial access SSBs. In some cases, the base station 105-b may configure the initial access SSBs as part of a beam sweep procedure that is used for initial access of UE 115-b to the base station 105-b.

At 310, the base station 105-*b* may configure additional SSBs and map the additional SSBs to the initial RACH resources. Such additional SSBs may indicate that one or more additional transmission beams are configured at the base station 105-*b*, which may provide coverage enhancement or refined beams that may be narrower than the initial access beams. As discussed above, the additional SSBs may not have dedicated corresponding RACH resources, and techniques such as discussed herein provide an opportunity for the UE 115-*b* to select one of the additional beams associated with the additional SSBs for a connection with the base station 105-*b*. The base station 105-*b* may transmit SSB transmissions 315 in accordance with the initial access procedure (e.g., via a beam sweep procedure).

At 320, the UE 115-*b* may initiate system access and perform a SSB search to identify initial access SSBs and associated RACH resources. In some cases, the SSB search may be performed by monitoring one or more preconfigured SSB bandwidths. In some cases, SSB transmissions from the base station 105-*b* may occupy 20 RBs, and the UE 115-*b* may monitor potential locations within a SSB search space for a SSB. In some cases, the UE 115-*b* may perform such monitoring when doing initial system access. In other cases, the UE 115-*b* may perform such monitoring as part of a handover procedure for changing serving base stations 105 at the UE 115-*b*. The UE 115-*b* may identify an initial access SSB, such as based on a measurement of one of more reference signals transmitted in the initial access SSBs that has a highest or acceptable signal strength, and identify RACH resources associated with the identified SSB.

The base station 105-*b* and UE 115-*b*, at 325, may perform a connection establishment. Such a connection establishment may include a random access procedure. For example, the UE 115-*b* may transmit a random access request (e.g., a MSG1 transmission) using the identified RACH resources. The base station 105-*b* may receive the random access request, and identify the selected initial access beam based on the RACH resources used for the random access request, and transmit a random access response (e.g., a MSG2 transmission) to the UE 115-*b*. The UE 115-*b* may receive the random access response and transmit a connection establishment request (e.g., a MSG3 transmission). The base station 105-*b* may receive the connection establishment request and transmit an acknowledgment (e.g., a MSG4 transmission) back to the UE 115-*b*, followed by RRC signaling that may be used to establish the connection.

At 330, the base station 105-*b* may identify additional system information indicating additional SSBs that may be configured at the base station 105-*b*. As indicated above, additional transmission beams besides the initial access beams may be configured by the base station 105-*b* for purposes of coverage enhancement or beam refinement, which may not have associated RACH resources. The base station 105-*b* may transmit the additional system information that indicates the additional SSBs at 335. In some cases, the base station 105-*b* may transmit such information as part of the connection establishment or may transmit the information subsequent to the connection establishment.

At 340, the UE 115-*b* may identify the additional SSBs and associated transmission beams. At 345, the UE 115-*b* may map the additional SSBs and associated transmission beams to the initial RACH resources that are configured for the initial access SSBs. In some cases, the mapping between RACH resources associated with the additional beams SSBs and the initial access SSBs may be provided in system information transmitted as part of the connection establishment (e.g., in a RMSI transmission that indicates additional system information). In some cases, mapping may be predefined and specified. In some cases, a number of mappings may be predefined in an indexed set of mappings, and the base station 105-*b* may signal an index value to the UE 115-*b* with the additional system information at 335, to indicate which mapping to use. In other cases, dedicated signaling may explicitly indicate the mapping. In some cases, the UE 115-*b* may identify the RACH resources for an additional SSB based on which initial access SSB is closest to the additional SSB (i.e., which of the initial access beams has beamforming parameters that are most similar to the selected additional beam). The UE 115-*b* may then select the RACH resources that correspond to the closest initial access SSB for the random access request.

Figure 4:
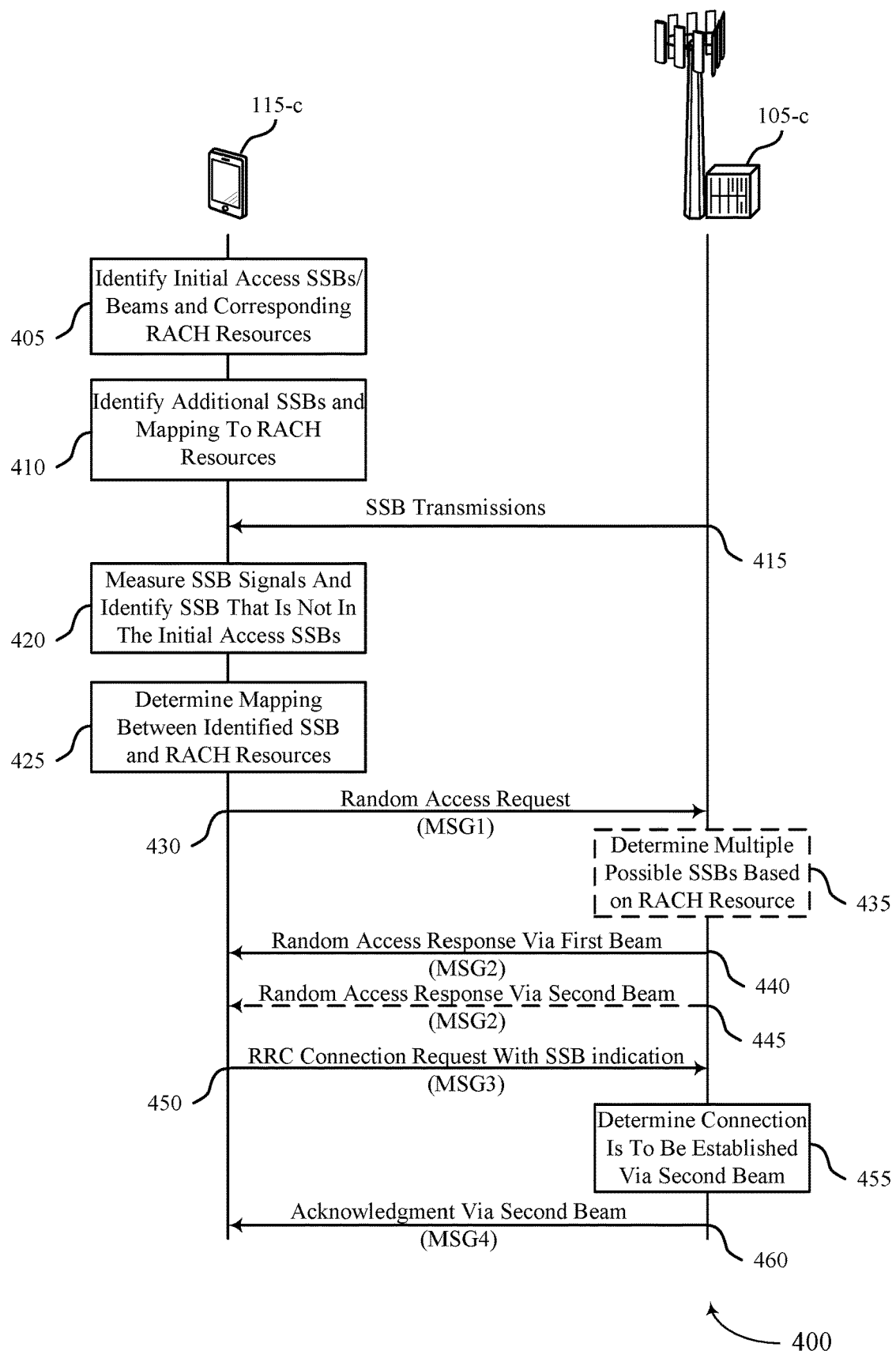
FIG. 4 illustrates an example of a process flow that supports random access techniques in beamformed wireless communications in accordance with aspects of the present disclosure.

FIG. 4 illustrates an example of a process flow 400 that supports random access techniques in beamformed wireless communications in accordance with aspects of the present disclosure. In some examples, process flow 400 may implement aspects of wireless communication system 100. Process flow 400 includes a UE 115-*c* and a base station 105-*c*, which may be respective examples of a UE 115 and a base station 105 as described with reference to FIGS. 1 through 3.

At 405, the UE 115-*c* may identify initial access SSBs/beams and corresponding RACH resources. As discussed above, the UE 115-*c* may identify the initial access SSBs/beams based on RMSI provided in the initial access SSBs, which may provide a bitmap of configured SSBs.

At 410, the UE 115-*c* may identify additional SSBs and associated transmission beams, and a mapping of the additional SSBs and associated transmission beams to the initial RACH resources that are configured for the initial access SSBs. Such identification and mapping may be performed in a manner as discussed above with respect to FIGS. 2 and 3, for example.

The base station 105-*c* may transmit SSB transmission 415, via associated transmission beams, which may be monitored by the UE 115-*c*. At 420, the UE 115-*c* may measure the SSB transmissions, such as by measuring a reference signal received power of a reference signal in the SSB transmissions, and identify a SSB for establishing a connection that is not in the initial access SSBs.

At 425, the UE 115-*c* may determine the mapping between the identified SSB and RACH resources to be used to transmit a random access request to the base station 105-*c*. As discussed above, the mapping may identify which of the initial access RACH resources may be used to transmit a random access request for one of the additional SSBs.

The UE 115-*c* may transmit, at 430, the random access request (e.g., MSG1) to the base station 105-*c*. The random access request may be transmitted using the resources determined based on the mapping between the additional SSBs and the initial access SSBs.

Optionally, at 435, the base station 105-*c* may receive the random access request and determine if multiple possible SSBs are mapped to a RACH resource used to transmit the random access request. In the event that two or more SSBs are mapped to the RACH resource, the base station 105-*c* may identify the SSBs and associated transmission beams, including the initial access beam and one or more additional beams. The initial access beam may be a first transmission beam, and an additional beam may be a second transmission beam. The base station 105-*c* may transmit a random access response (e.g., MSG2) via the first beam at 440. In some cases, the UE 115-*c* may monitor for the random access response on the first beam, even though the UE 115-*c* had selected the second beam for establishing a connection with the base station 105-c. In some cases, the base station 105-c may optionally repeat the transmission of the random access response via the second beam, at 445. In such cases, the UE 115-c may monitor the second beam for the random access response.

The UE 115-c, upon receiving the random access response, may transmit a RRC connection request (e.g., MSG3) at 450. In some cases, the RRC connection request may include a field that indicates that the UE 115-c has selected the second beam for communications with the base station 105-c. For example, the RRC connection request may have a field (e.g., a one-bit flag) that indicates an additional beam associated with the RACH resources has been selected. In such cases, when mapping RACH resources of the additional beams to RACH resources of the initial access beams, one additional beam may be associated with any particular RACH resource. In other examples, the RRC connection request may include an explicit identification of the selected second beam (e.g., a field that explicitly identified which of 64 available SSBs is selected by the UE 115-c). In other examples, the UE 115-c may indicate the selected second beam after the RRC connection request, such as after entering connected mode (e.g., the indication of the second beam may be transmitted via RRC/MAC-CE etc.).

At 455, the base station 105-c may determine that a connection is to be established via the second beam. The base station 105-c may transmit an acknowledgment (e.g., MSG4), at 460, to indicate to the UE 115-c that an RRC connection establishment procedure is to be performed.

Figure 5:
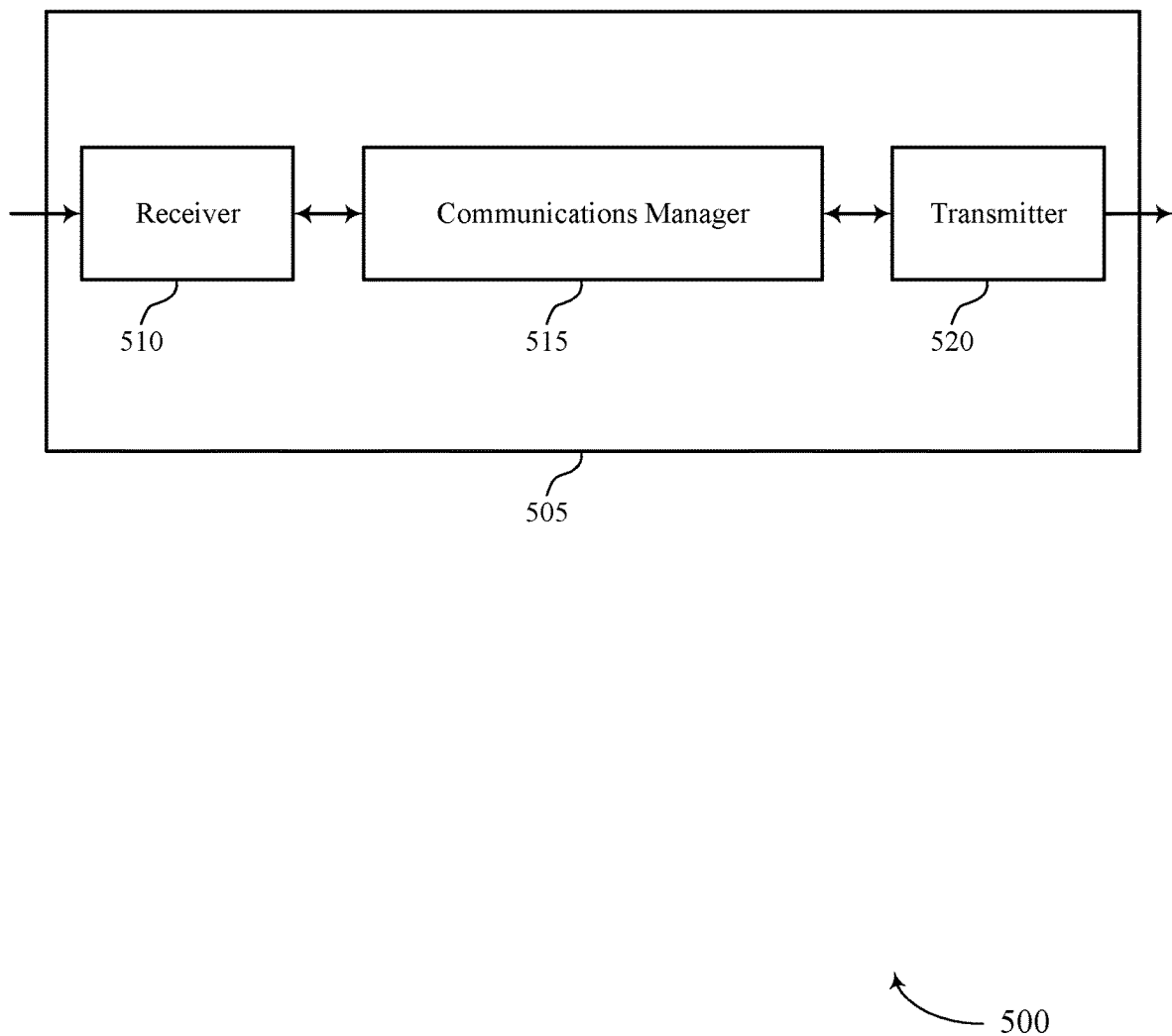
FIGS. 5 and 6 show block diagrams of devices that support random access techniques in beamformed wireless communications in accordance with aspects of the present disclosure.

FIG. 5 shows a block diagram 500 of a device 505 that supports random access techniques in beamformed wireless communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to random access techniques in beamformed wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a first set of transmission beams to monitor for system information of a base station, identify a first set of random access resources for transmission of a random access request to the base station, the first set of random access resources including a first random access resource that is associated with a first transmission beam of the first set of transmission beams, transmit a first random access request to the base station using the first random access resource to initiate a connection establishment with the base station, receive, based on the connection establishment, configuration information that indicates a second set of transmission beams, where the second set of transmission beams includes each transmission beam of the first set of transmission beams and at least an additional transmission beam, and map the additional transmission beam to at least the first random access resource.

In some cases, the communications manager 515 may also transmit a first random access request to a base station using a first random access resource to initiate a connection establishment with the base station, the first random access resource associated with a first transmission beam of a first set of transmission beams for monitoring system information of the base station, transmit a second random access request to the base station based on the additional transmission beam, where the second random access request uses the first random access resource, and receive, based on the connection establishment, configuration information that indicates a second set of transmission beams, where the second set of transmission beams includes each transmission beam of the first set of transmission beams and at least an additional transmission beam.

In further cases, the communications manager 515 may also identify a set of SSBs to monitor for system information of a base station, the set of SSBs including a first subset of SSBs and a second subset of SSBs, identify a first random access resource that is associated with both a first SSB of the first subset of SSBs and a second SSB of the second subset of SSBs, determine to communicate with the base station using a second transmission beam associated with the second SSB, transmit an indication to the base station that the second transmission beam is to be used for communications, and transmit a random access request to a base station using the first random access resource. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
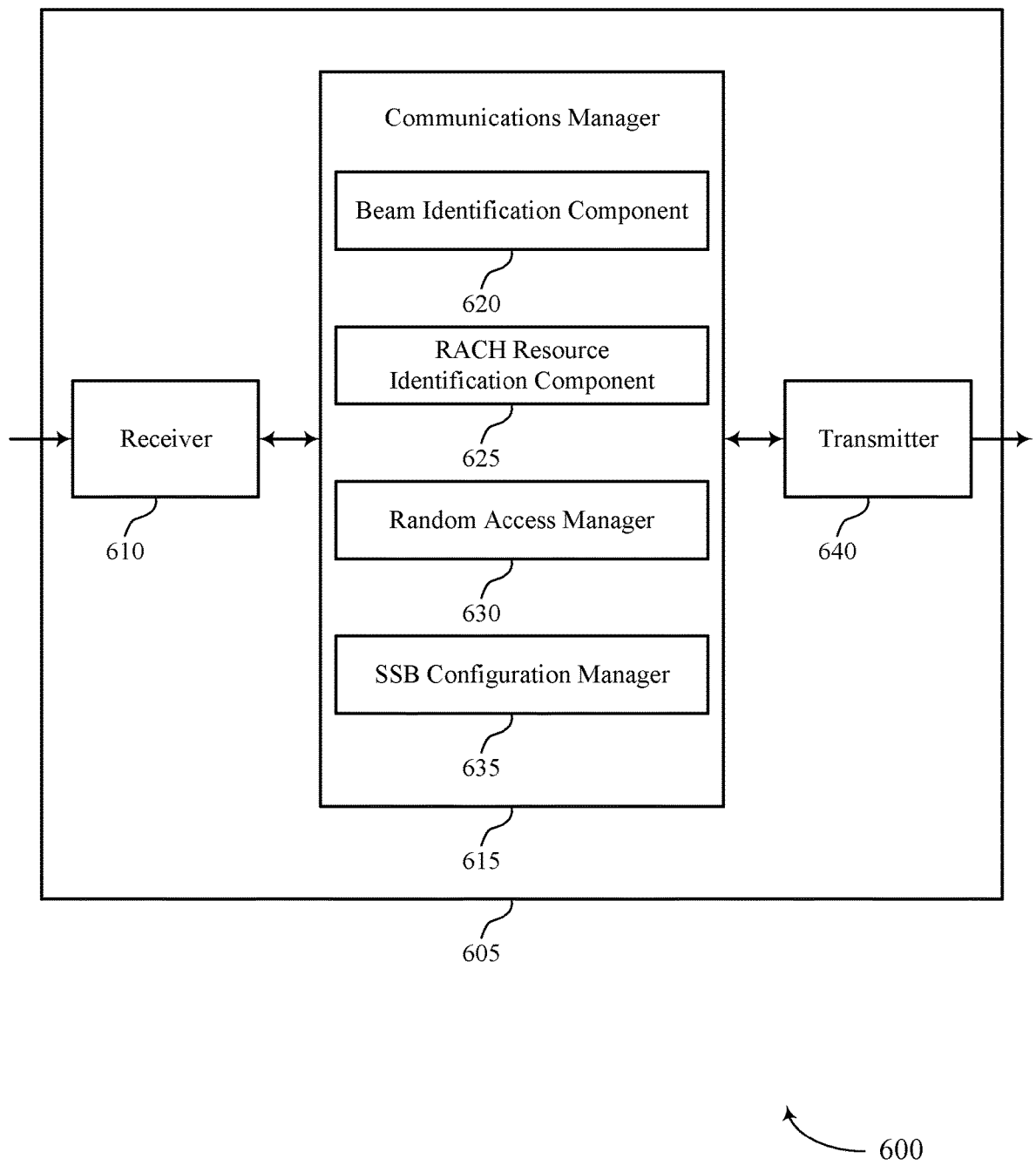

FIG. 6 shows a block diagram 600 of a device 605 that supports random access techniques in beamformed wireless communications in accordance with aspects of the present disclosure. The device 605 may be an example of aspects of a device 505 or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to random access techniques in beamformed wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a beam identification component 620, a RACH resource identification component 625, a random access manager 630, and a SSB configuration manager 635. The communications manager 615 may be an example of aspects of the communications manager 810 described herein.

The beam identification component 620, in some cases, may identify a first set of transmission beams to monitor for system information of a base station. In some cases, the beam identification component 620 may receive, based on a connection establishment, configuration information that indicates a second set of transmission beams, where the second set of transmission beams includes each transmission beam of the first set of transmission beams and at least an additional transmission beam. The beam identification component 620 may also decide to communicate with the base station using a second transmission beam associated with a second SSB, that is not an initial access SSB, and transmit an indication to the base station that the second transmission beam is to be used for communications.

The RACH resource identification component 625 may identify a first set of random access resources for transmission of a random access request to the base station, the first set of random access resources including a first random access resource that is associated with a first transmission beam of the first set of transmission beams. In some cases, the RACH resource identification component 625 may identify a first random access resource that is associated with both a first SSB of the first subset of SSBs and a second SSB of the second subset of SSBs.

The random access manager 630 may transmit a first random access request to the base station using the first random access resource to initiate a connection establishment with the base station. In some cases, the first random access resource may be associated with a first transmission beam of a first set of transmission beams for monitoring system information of the base station and a second random access request may be transmitted based on the additional transmission beam, where the second random access request uses the first random access resource.

The SSB configuration manager 635 may receive, based on the connection establishment, configuration information that indicates a second set of transmission beams, where the second set of transmission beams includes each transmission beam of the first set of transmission beams and at least an additional transmission beam and map the additional transmission beam to at least the first random access resource. In some cases, the SSB configuration manager 635 may identify a set of SSBs to monitor for system information of a base station, the set of SSBs including a first subset of SSBs and a second subset of SSBs.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
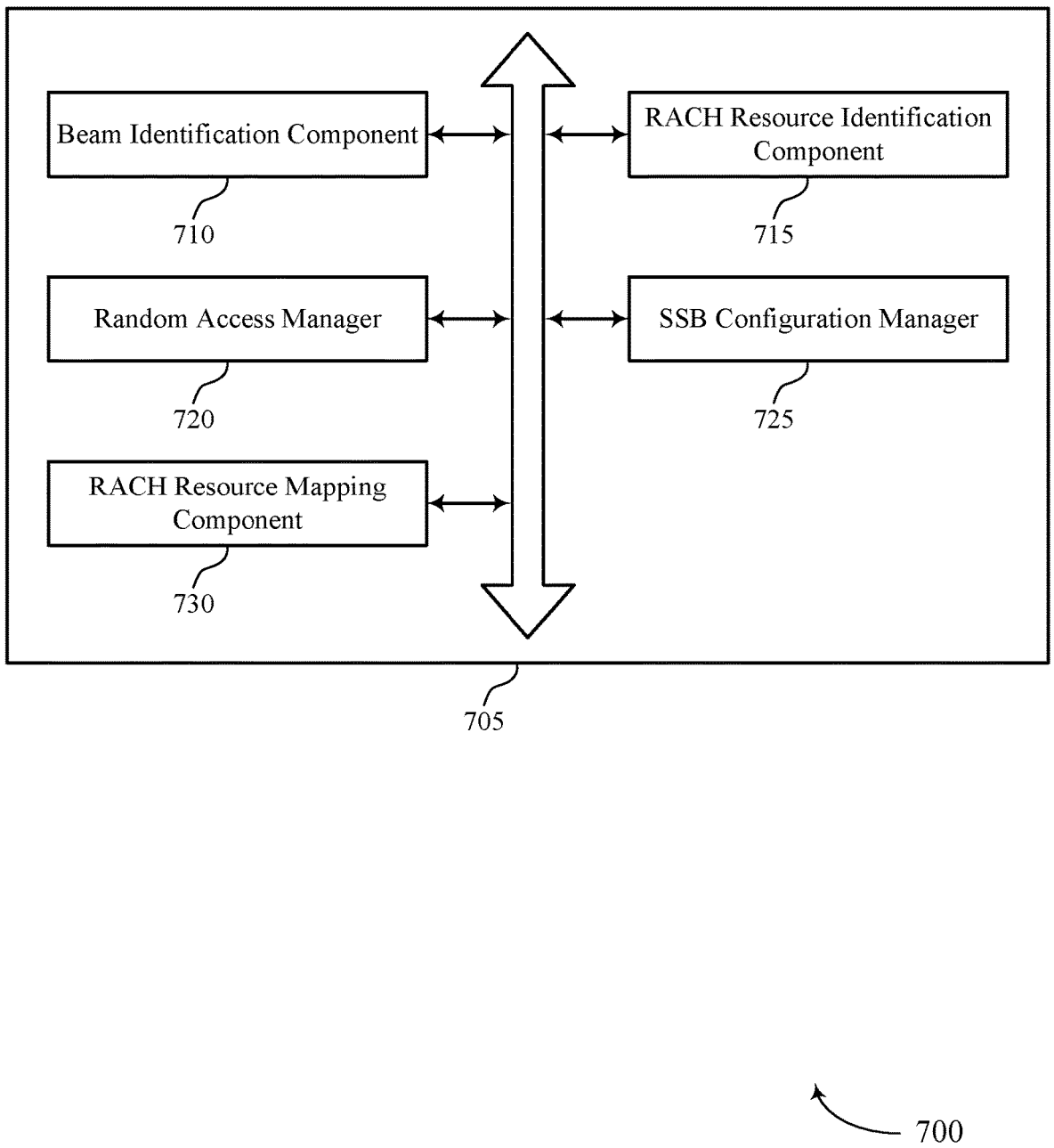
FIG. 7 shows a block diagram of a communications manager that supports random access techniques in beamformed wireless communications in accordance with aspects of the present disclosure.

FIG. 7 shows a block diagram 700 of a communications manager 705 that supports random access techniques in beamformed wireless communications in accordance with aspects of the present disclosure. The communications manager 705 may be an example of aspects of a communications manager 515, a communications manager 615, or a communications manager 810 described herein. The communications manager 705 may include a beam identification component 710, a RACH resource identification component 715, a random access manager 720, a SSB configuration manager 725, and a RACH resource mapping component 730. Each of these modules may communicate, directly or indirectly, with one another (e.g., via one or more buses).

The beam identification component 710 may identify a first set of transmission beams to monitor for system information of a base station. In some examples, the beam identification component 710 may receive, based on the connection establishment, configuration information that indicates a second set of transmission beams, where the second set of transmission beams includes each transmission beam of the first set of transmission beams and at least an additional transmission beam. In some examples, the beam identification component 710 may determine to communicate with the base station using a second transmission beam associated with the second SSB. In some examples, the beam identification component 710 may transmit an indication to the base station that the second transmission beam is to be used for communications.

The RACH resource identification component 715 may identify a first set of random access resources for transmission of a random access request to the base station, the first set of random access resources including a first random access resource that is associated with a first transmission beam of the first set of transmission beams. In some examples, the RACH resource identification component 715 may identify a first random access resource that is associated with both a first SSB of the first subset of SSBs and a second SSB of the second subset of SSBs.

The random access manager 720 may transmit a first random access request to the base station using the first random access resource to initiate a connection establishment with the base station. In some examples, the first random access resource is associated with a first transmission beam of a first set of transmission beams for monitoring system information of the base station. In some examples, the random access manager 720 may transmit a second random access request to the base station based on the additional transmission beam, where the second random access request uses the first random access resource.

In some examples, the random access manager 720 may monitor for a random access response to the second random access request on resources associated with each of the first transmission beam and the additional transmission beam. In some cases, the second random access message is a message three (MSG3) transmission in a random access procedure. In some examples, the random access manager 720 may transmit a third random access message to the base station responsive to the random access response, the third random access message identifying the additional transmission beam is to be used for communications. In some examples, the random access manager 720 may receive a fourth random access message from the base station via the additional transmission beam.

The SSB configuration manager 725 may receive, based on the connection establishment, configuration information that indicates a second set of transmission beams, where the second set of transmission beams includes each transmission beam of the first set of transmission beams and at least an additional transmission beam. In some examples, the SSB configuration manager 725 may map the additional transmission beam to at least the first random access resource. In some examples, the SSB configuration manager 725 may identify a set of SSBs to monitor for system information of a base station, the set of SSBs including a first subset of SSBs and a second subset of SSBs.

In some examples, the SSB configuration manager 725 may receive a remaining minimum system information (RMSI) transmission from the base station that indicates the first set of transmission beams, and where the first set of random access resources is determined based on the first set of transmission beams.

The RACH resource mapping component 730 may receive an indication of a mapping between the first set of random access resources and the additional transmission beam. In some examples, the RACH resource mapping component 730 may determine that the first transmission beam of the first set of transmission beams has a first set of beamforming parameters that are closer to a second set of beamforming parameters of the additional transmission beam than other transmission beams of the first set of transmission beams. In some cases, the indication of the mapping is received in one or more of RMSI from the base station, or RRC signaling from the base station. In some cases, the indication of the mapping includes an explicit indication of a correspondence between each additional transmission beam and a random access resource of the first set of random access resources, or an index value of a predefined indexed set of mappings.

Figure 8:
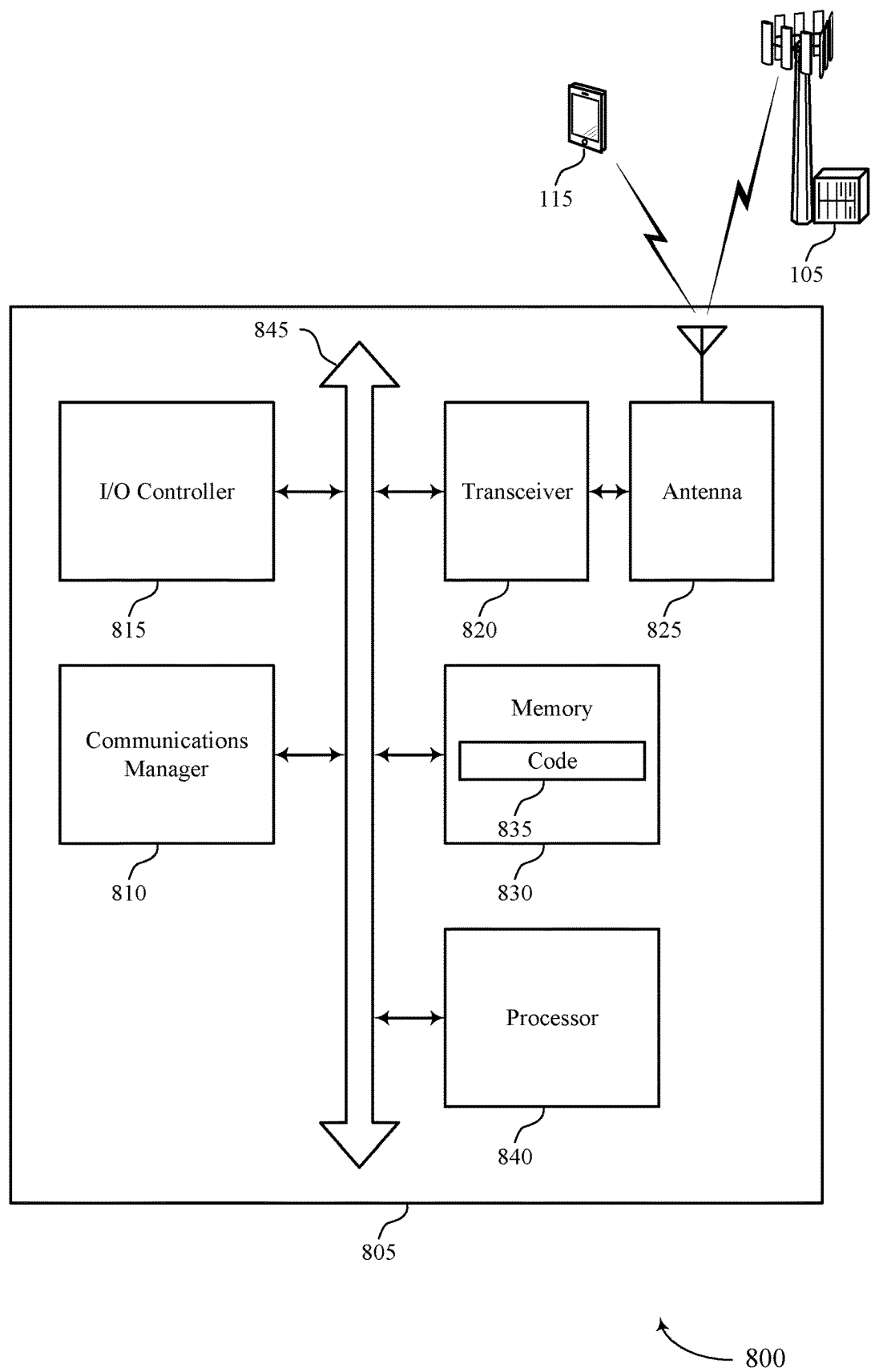
FIG. 8 shows a diagram of a system including a device that supports random access techniques in beamformed wireless communications in accordance with aspects of the present disclosure.

FIG. 8 shows a diagram of a system 800 including a device 805 that supports random access techniques in beamformed wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In some cases, the communications manager 810 may identify a first set of transmission beams to monitor for system information of a base station, identify a first set of random access resources for transmission of a random access request to the base station, the first set of random access resources including a first random access resource that is associated with a first transmission beam of the first set of transmission beams, transmit a first random access request to the base station using the first random access resource to initiate a connection establishment with the base station, receive, based on the connection establishment, configuration information that indicates a second set of transmission beams, where the second set of transmission beams includes each transmission beam of the first set of transmission beams and at least an additional transmission beam, and map the additional transmission beam to at least the first random access resource.

In some cases, the communications manager 810 may also transmit a first random access request to a base station using a first random access resource to initiate a connection establishment with the base station, the first random access resource associated with a first transmission beam of a first set of transmission beams for monitoring system information of the base station, transmit a second random access request to the base station based on the additional transmission beam, where the second random access request uses the first random access resource, and receive, based on the connection establishment, configuration information that indicates a second set of transmission beams, where the second set of transmission beams includes each transmission beam of the first set of transmission beams and at least an additional transmission beam.

In some cases, the communications manager 810 may also identify a set of SSBs to monitor for system information of a base station, the set of SSBs including a first subset of SSBs and a second subset of SSBs, identify a first random access resource that is associated with both a first SSB of the first subset of SSBs and a second SSB of the second subset of SSBs, determine to communicate with the base station using a second transmission beam associated with the second SSB, transmit an indication to the base station that the second transmission beam is to be used for communications, and transmit a random access request to a base station using the first random access resource.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting random access techniques in beamformed wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
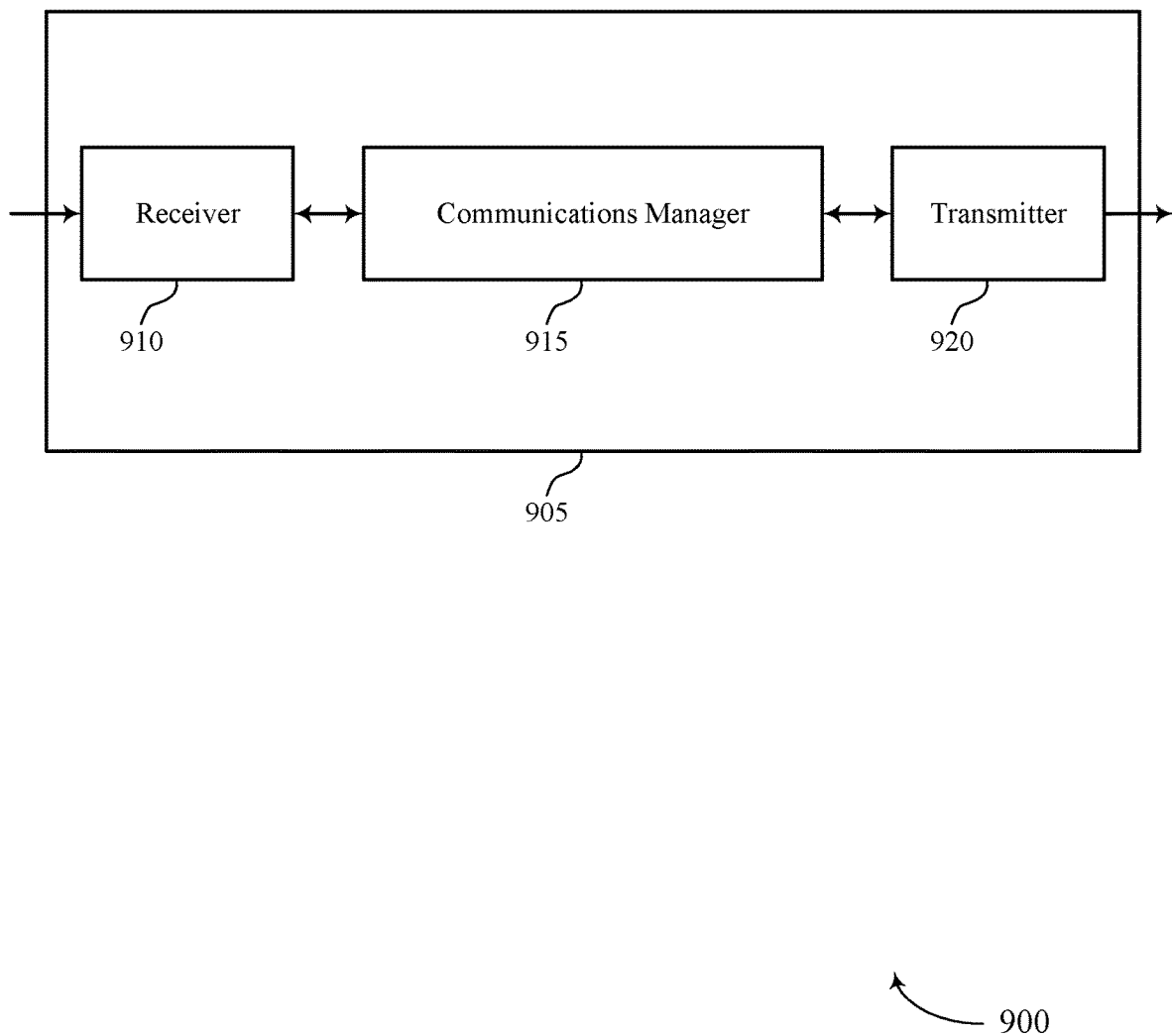
FIGS. 9 and 10 show block diagrams of devices that support random access techniques in beamformed wireless communications in accordance with aspects of the present disclosure.

FIG. 9 shows a block diagram 900 of a device 905 that supports random access techniques in beamformed wireless communications in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to random access techniques in beamformed wireless communications, etc.). Information may be passed on to other components of the device 905. The receiver 910 may be an example of aspects of the transceiver 1220 described with reference to FIG. 12. The receiver 910 may utilize a single antenna or a set of antennas.

In some cases, the communications manager 915 may configure a first set of transmission beams for transmission of system information to at least a first UE for initial system access, and a first set of random access resources for transmission of random access requests by one or more UEs, the first set of random access resources including a first random access resource that is associated with a first transmission beam of the first set of transmission beams, transmit, during the connection establishment, configuration information that indicates a second set of transmission beams, where the second set of transmission beams includes each transmission beam of the first set of transmission beams and at least a second transmission beam in addition to the first set of transmission beams, receive a first random access request from the first UE using the first random access resource to initiate a connection establishment with the base station, and map the second transmission beam to at least the first random access resource.

In some cases, the communications manager 915 may also configure a set of SSBs for transmission of system information to at least a first UE, the set of SSBs including a first subset of SSBs and a second subset of SSBs, identify a first random access resource that is associated with both a first SSB of the first subset of SSBs and a second SSB of the second subset of SSBs, receive a random access request from the first UE via the first random access resource, and receive, subsequent to receiving the random access request, an indication from the first UE that a second transmission beam associated with the second SSB is to be used for communications with the first UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other PLD, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
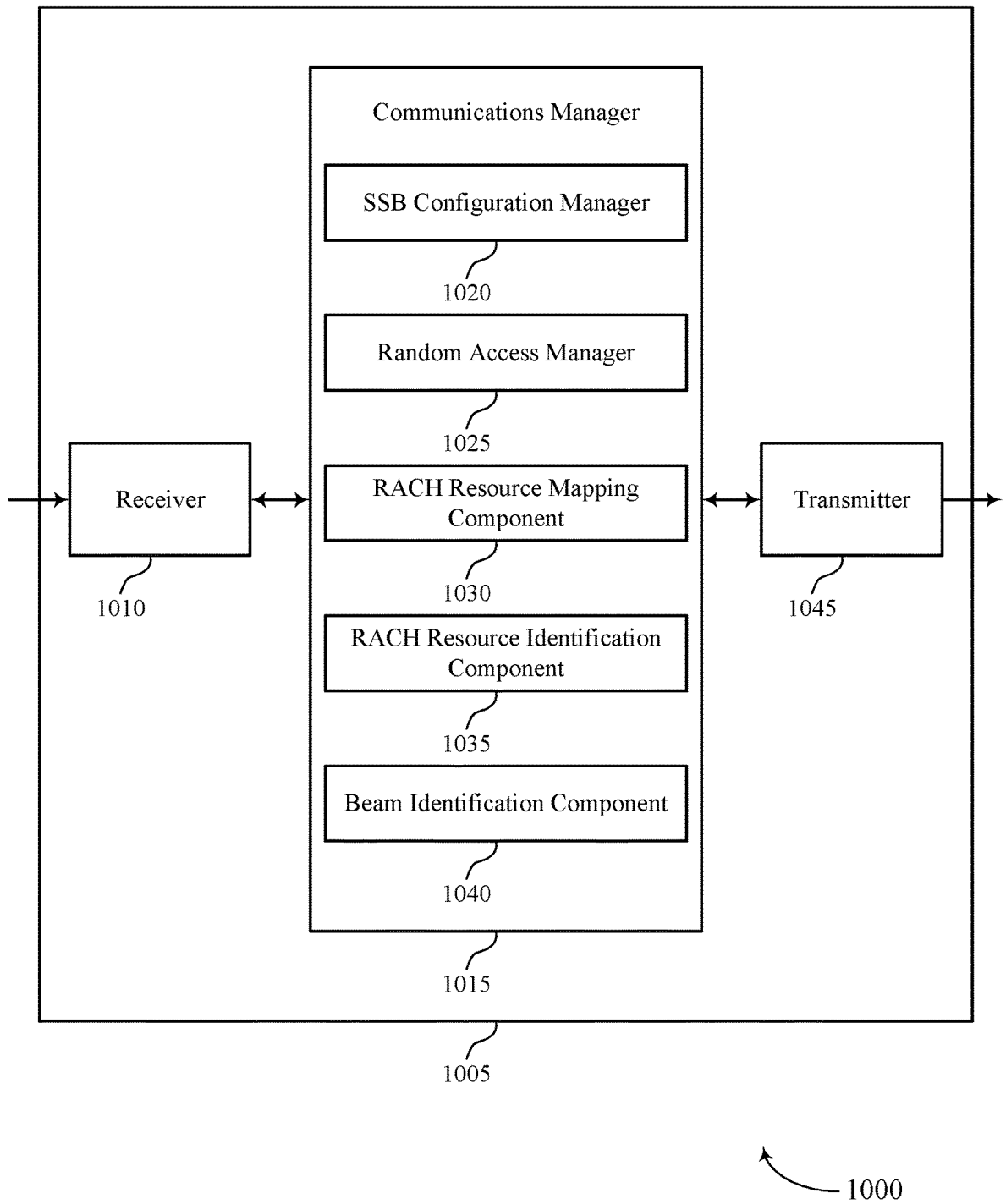

FIG. 10 shows a block diagram 1000 of a device 1005 that supports random access techniques in beamformed wireless communications in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to random access techniques in beamformed wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a SSB configuration manager 1020, a random access manager 1025, a RACH resource mapping component 1030, a RACH resource identification component 1035, and a beam identification component 1040. The communications manager

1015 may be an example of aspects of the communications manager 1210 described herein.

The SSB configuration manager 1020 may configure a first set of transmission beams for transmission of system information to at least a first UE for initial system access, and a first set of random access resources for transmission of random access requests by one or more UEs, the first set of random access resources including a first random access resource that is associated with a first transmission beam of the first set of transmission beams and transmit, during the connection establishment, configuration information that indicates a second set of transmission beams, where the second set of transmission beams includes each transmission beam of the first set of transmission beams and at least a second transmission beam in addition to the first set of transmission beams. In some cases, the SSB configuration manager 1020 may configure a set of SSBs for transmission of system information to at least a first UE, the set of SSBs including a first subset of SSBs and a second subset of SSBs.

The random access manager 1025 may receive a first random access request from the first UE using the first random access resource to initiate a connection establishment with the base station.

The RACH resource mapping component 1030 may map the second transmission beam to at least the first random access resource. The RACH resource identification component 1035 may identify a first random access resource that is associated with both a first SSB of the first subset of SSBs and a second SSB of the second subset of SSBs.

The beam identification component 1040 may receive, subsequent to receiving the random access request, an indication from the first UE that a second transmission beam associated with the second SSB is to be used for communications with the first UE.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
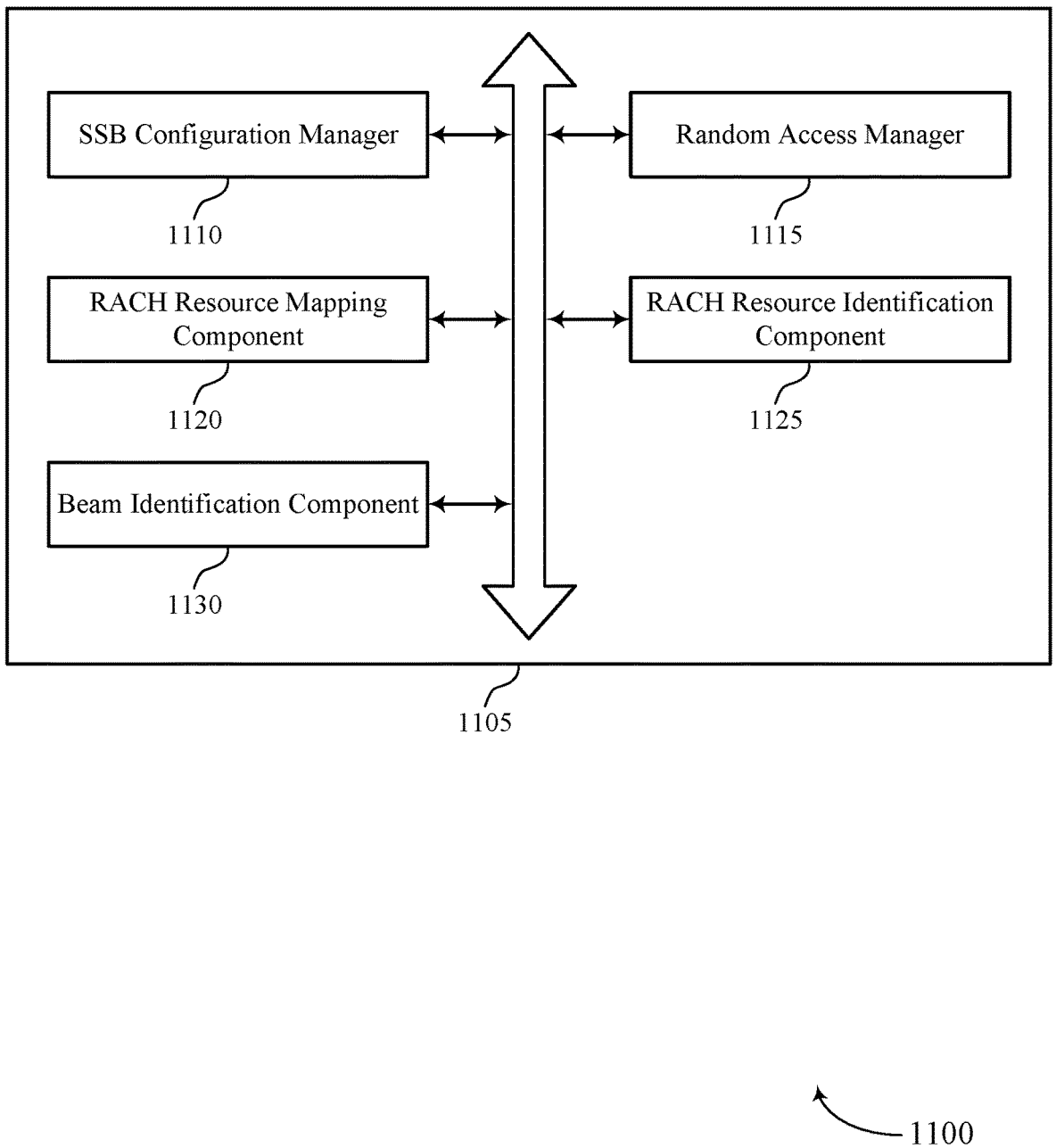
FIG. 11 shows a block diagram of a communications manager that supports random access techniques in beamformed wireless communications in accordance with aspects of the present disclosure.

FIG. 11 shows a block diagram 1100 of a communications manager 1105 that supports random access techniques in beamformed wireless communications in accordance with aspects of the present disclosure. The communications manager 1105 may be an example of aspects of a communications manager 915, a communications manager 1015, or a communications manager 1210 described herein. The communications manager 1105 may include a SSB configuration manager 1110, a random access manager 1115, a RACH resource mapping component 1120, a RACH resource identification component 1125, and a beam identification component 1130. Each of these modules may communicate, directly or indirectly, with one another (e.g., via one or more buses).

The SSB configuration manager 1110 may configure a first set of transmission beams for transmission of system information to at least a first UE for initial system access, and a first set of random access resources for transmission of random access requests by one or more UEs, the first set of random access resources including a first random access resource that is associated with a first transmission beam of the first set of transmission beams. In some examples, the SSB configuration manager 1110 may transmit, during the connection establishment, configuration information that indicates a second set of transmission beams, where the second set of transmission beams includes each transmission beam of the first set of transmission beams and at least a second transmission beam in addition to the first set of transmission beams. In some examples, the SSB configuration manager 1110 may configure a set of SSBs for transmission of system information to at least a first UE, the set of SSBs including a first subset of SSBs and a second subset of SSBs.

In some examples, the SSB configuration manager 1110 may transmit a SSB using each transmission beam of the first set of transmission beams, the SSB including remaining minimum system information (RMSI) that indicates the first set of transmission beams, and where the first set of random access resources is determined based on the first set of transmission beams. In some examples, the SSB configuration manager 1110 may transmit additional system information to the first UE indicating one or more additional transmission beams, in addition to the first set of transmission beams, are available for communications.

The random access manager 1115 may receive a first random access request from the first UE using the first random access resource to initiate a connection establishment with the base station. In some examples, the random access manager 1115 may receive a second random access request from the first UE using the first random access resource.

In some examples, the random access manager 1115 may transmit a random access response to the second random access request using each of the first transmission beam and the second transmission beam. In some examples, the random access manager 1115 may receive a third random access message from the first UE responsive to the random access response, the third random access message identifying the second transmission beam is to be used for communications. In some examples, the random access manager 1115 may transmit a fourth random access message from the base station via the second transmission beam.

The RACH resource mapping component 1120 may map the second transmission beam to at least the first random access resource. In some examples, the RACH resource mapping component 1120 may transmit an indication of a mapping between the first set of random access resources and the one or more additional transmission beams. In some cases, the indication of the mapping includes an explicit indication of a correspondence between each of the additional transmission beams and a random access resource of the first set of random access resources, or an index value of a predefined indexed set of mappings.

The RACH resource identification component 1125 may identify a first random access resource that is associated with both a first SSB of the first subset of SSBs and a second SSB of the second subset of SSBs.

The beam identification component 1130 may receive, subsequent to receiving the random access request, an indication from the first UE that a second transmission beam associated with the second SSB is to be used for communications with the first UE. In some examples, the beam identification component 1130 may communicate with the first UE via the second transmission beam.

Figure 12:
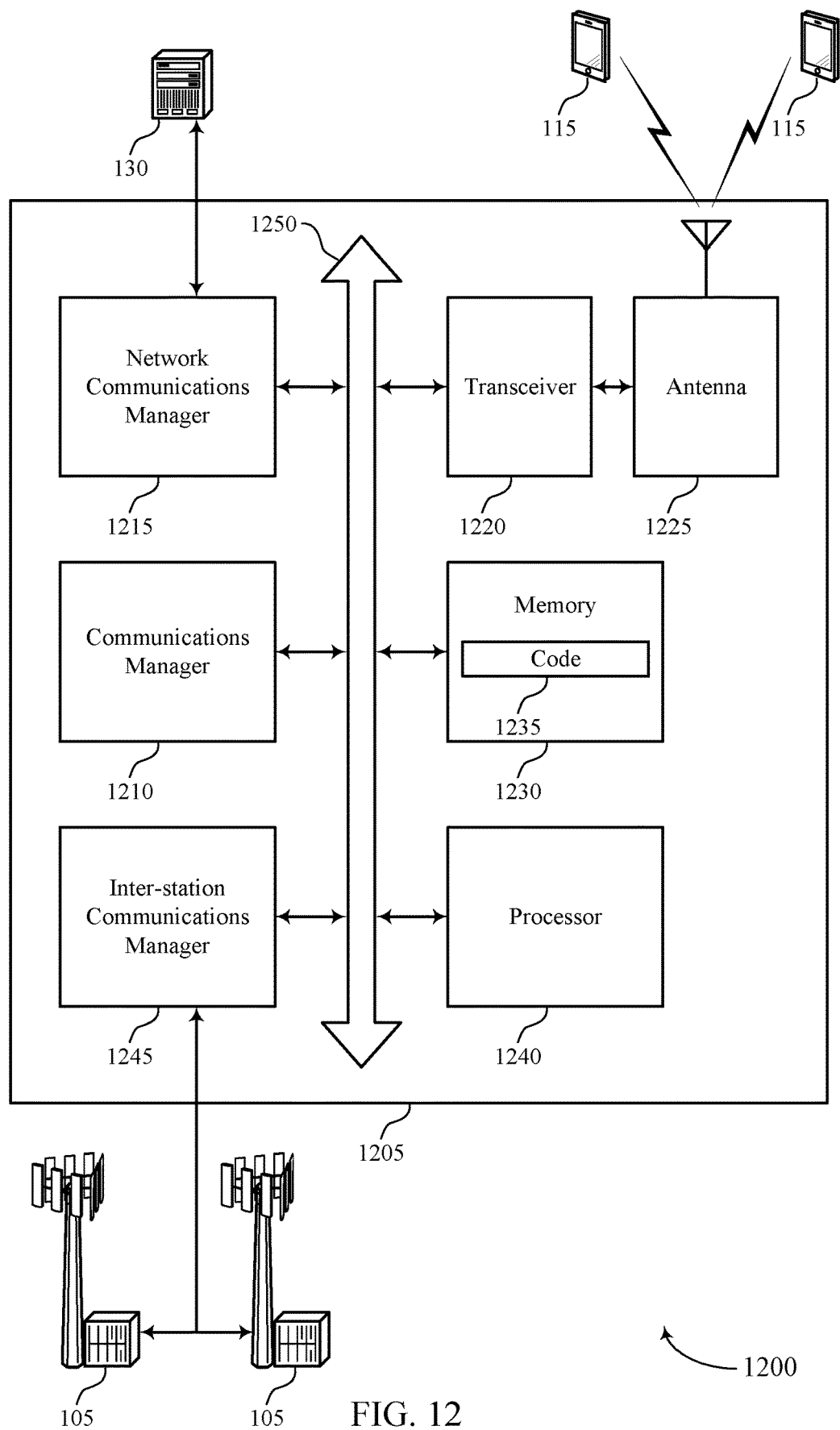
FIG. 12 shows a diagram of a system including a device that supports random access techniques in beamformed wireless communications in accordance with aspects of the present disclosure.

FIG. 12 shows a diagram of a system 1200 including a device 1205 that supports random access techniques in beamformed wireless communications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

In some cases, the communications manager 1210 may configure a first set of transmission beams for transmission of system information to at least a first UE for initial system access, and a first set of random access resources for transmission of random access requests by one or more UEs, the first set of random access resources including a first random access resource that is associated with a first transmission beam of the first set of transmission beams, transmit, during the connection establishment, configuration information that indicates a second set of transmission beams, where the second set of transmission beams includes each transmission beam of the first set of transmission beams and at least a second transmission beam in addition to the first set of transmission beams, receive a first random access request from the first UE using the first random access resource to initiate a connection establishment with the base station, and map the second transmission beam to at least the first random access resource.

In some cases, the communications manager 1210 may also configure a set of SSBs for transmission of system information to at least a first UE, the set of SSBs including a first subset of SSBs and a second subset of SSBs, identify a first random access resource that is associated with both a first SSB of the first subset of SSBs and a second SSB of the second subset of SSBs, receive a random access request from the first UE via the first random access resource, and receive, subsequent to receiving the random access request, an indication from the first UE that a second transmission beam associated with the second SSB is to be used for communications with the first UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device to perform various functions (e.g., functions or tasks supporting random access techniques in beamformed wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
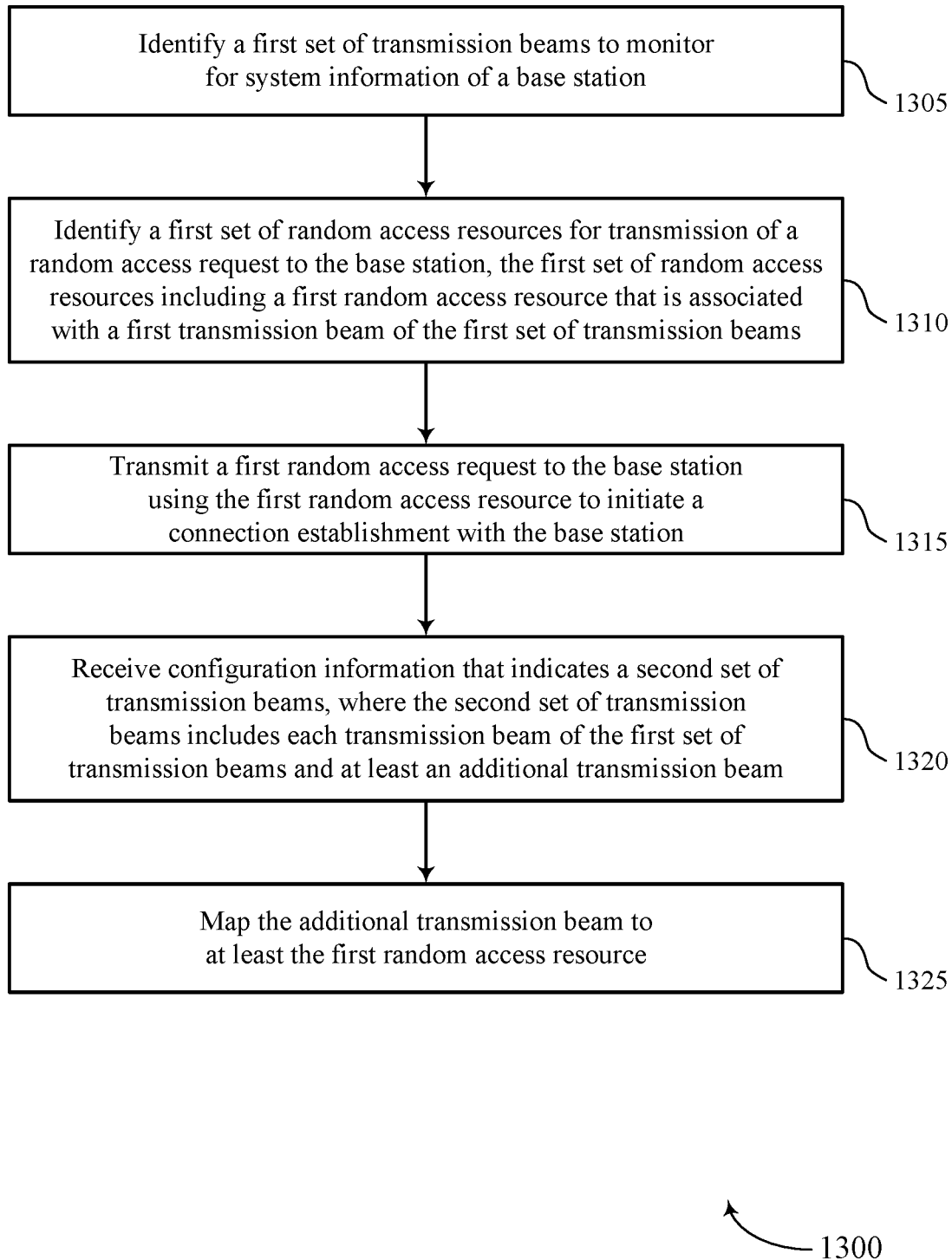
FIGS. 13 through 17 show flowcharts illustrating methods that support random access techniques in beamformed wireless communications in accordance with aspects of the present disclosure.

FIG. 13 shows a flowchart illustrating a method 1300 that supports random access techniques in beamformed wireless communications in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify a first set of transmission beams to monitor for system information of a base station. The operations of 1305 may be performed according to the methods described herein. In some examples, aspects of the operations of 1305 may be performed by a beam identification component as described with reference to FIGS. 5 through 8.

At 1310, the UE may identify a first set of random access resources for transmission of a random access request to the base station, the first set of random access resources including a first random access resource that is associated with a first transmission beam of the first set of transmission beams. The operations of 1310 may be performed according to the methods described herein. In some examples, aspects of the operations of 1310 may be performed by a RACH resource identification component as described with reference to FIGS. 5 through 8.

At 1315, the UE may transmit a first random access request to the base station using the first random access resource to initiate a connection establishment with the base station. The operations of 1315 may be performed according to the methods described herein. In some examples, aspects of the operations of 1315 may be performed by a random access manager as described with reference to FIGS. 5 through 8.

At 1320, the UE may receive configuration information that indicates a second set of transmission beams, where the second set of transmission beams includes each transmission beam of the first set of transmission beams and at least an additional transmission beam. The operations of 1320 may be performed according to the methods described herein. In some examples, aspects of the operations of 1320 may be performed by a SSB configuration manager as described with reference to FIGS. 5 through 8.

At 1325, the UE may map the additional transmission beam to at least the first random access resource. The operations of 1325 may be performed according to the methods described herein. In some examples, aspects of the operations of 1325 may be performed by a SSB configuration manager as described with reference to FIGS. 5 through 8.

Figure 14:
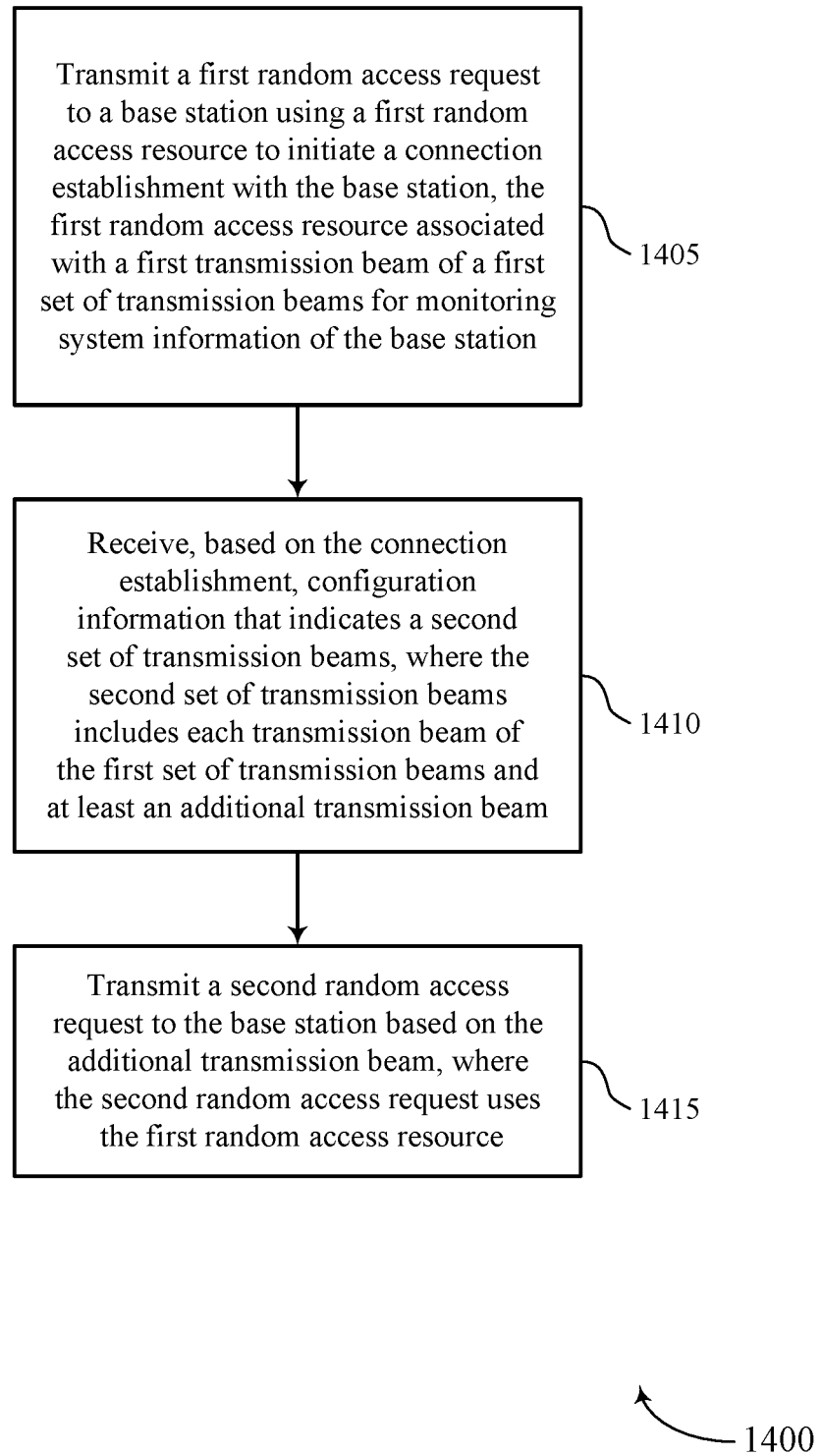

FIG. 14 shows a flowchart illustrating a method 1400 that supports random access techniques in beamformed wireless communications in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit a first random access request to a base station using a first random access resource to initiate a connection establishment with the base station, the first random access resource associated with a first transmission beam of a first set of transmission beams for monitoring system information of the base station. The operations of 1405 may be performed according to the methods described herein. In some examples, aspects of the operations of 1405 may be performed by a random access manager as described with reference to FIGS. 5 through 8.

At 1410, the UE may receive, based on the connection establishment, configuration information that indicates a second set of transmission beams, where the second set of transmission beams includes each transmission beam of the first set of transmission beams and at least an additional transmission beam. The operations of 1410 may be performed according to the methods described herein. In some examples, aspects of the operations of 1410 may be performed by a beam identification component as described with reference to FIGS. 5 through 8.

At 1415, the UE may transmit a second random access request to the base station based on the additional transmission beam, where the second random access request uses the first random access resource. The operations of 1415 may be performed according to the methods described herein. In some examples, aspects of the operations of 1415 may be performed by a random access manager as described with reference to FIGS. 5 through 8.

Figure 15:
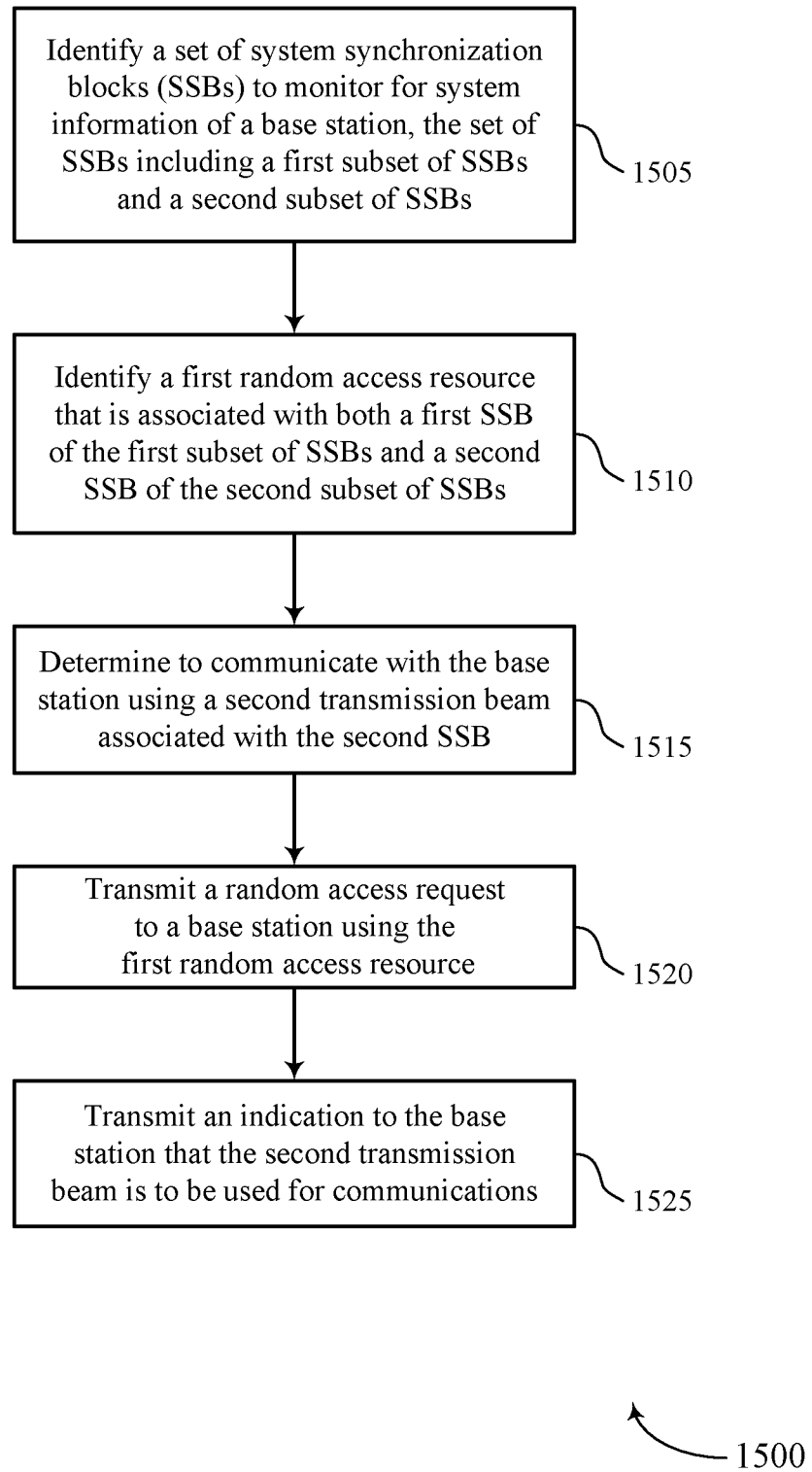

FIG. 15 shows a flowchart illustrating a method 1500 that supports random access techniques in beamformed wireless communications in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may identify a set of SSBs to monitor for system information of a base station, the set of SSBs including a first subset of SSBs and a second subset of SSBs. The operations of 1505 may be performed according to the methods described herein. In some examples, aspects of the operations of 1505 may be performed by a SSB configuration manager as described with reference to FIGS. 5 through 8.

At 1510, the UE may identify a first random access resource that is associated with both a first SSB of the first subset of SSBs and a second SSB of the second subset of SSBs. The operations of 1510 may be performed according to the methods described herein. In some examples, aspects of the operations of 1510 may be performed by a RACH resource identification component as described with reference to FIGS. 5 through 8.

At 1515, the UE may determine to communicate with the base station using a second transmission beam associated with the second SSB. The operations of 1515 may be performed according to the methods described herein. In some examples, aspects of the operations of 1515 may be performed by a beam identification component as described with reference to FIGS. 5 through 8.

At 1520, the UE may transmit a random access request to a base station using the first random access resource. The operations of 1520 may be performed according to the methods described herein. In some examples, aspects of the operations of 1520 may be performed by a random access manager as described with reference to FIGS. 5 through 8.

At 1525, the UE may transmit an indication to the base station that the second transmission beam is to be used for communications. The operations of 1525 may be performed according to the methods described herein. In some examples, aspects of the operations of 1525 may be performed by a beam identification component as described with reference to FIGS. 5 through 8.

Figure 16:
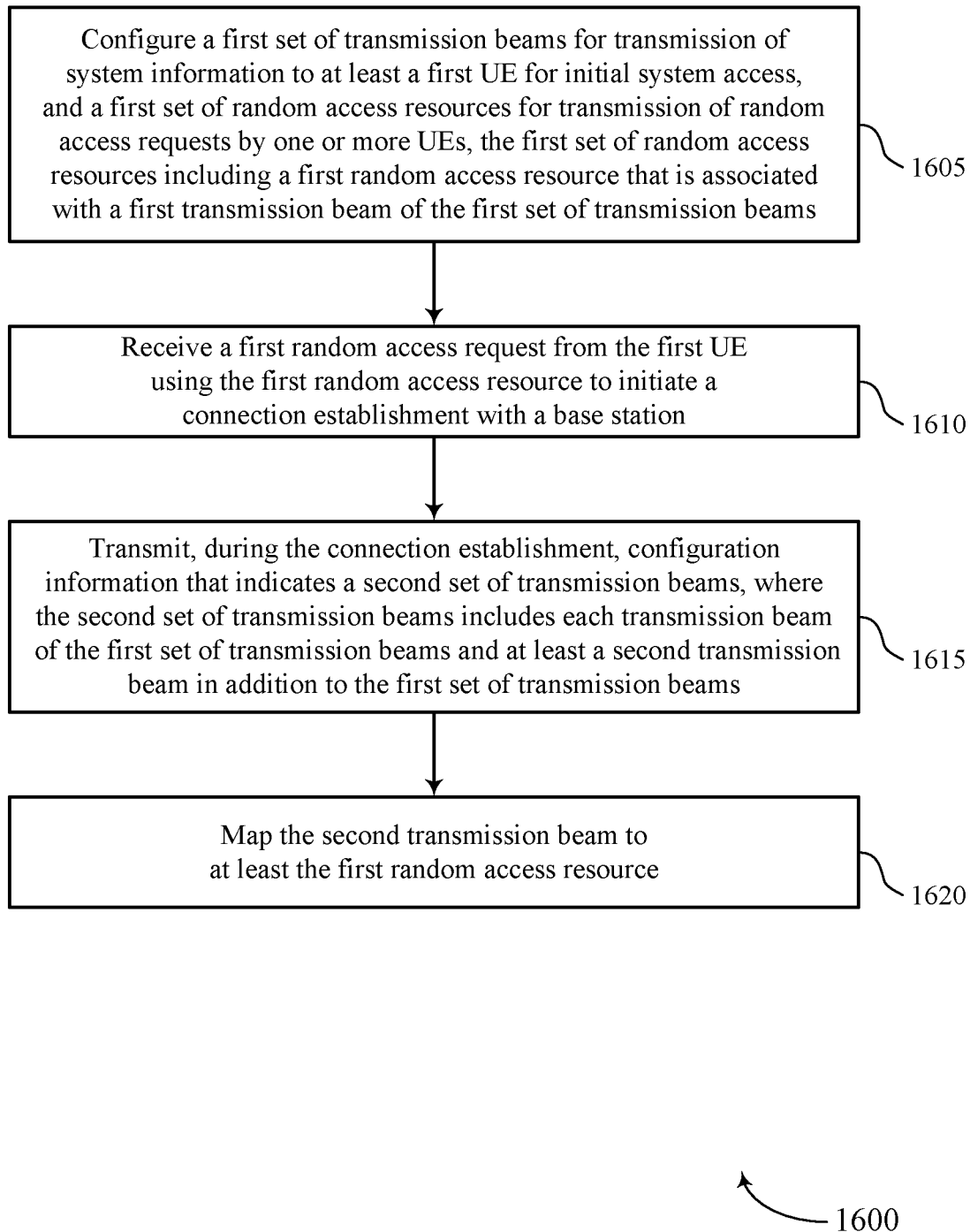

FIG. 16 shows a flowchart illustrating a method 1600 that supports random access techniques in beamformed wireless communications in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may configure a first set of transmission beams for transmission of system information to at least a first UE for initial system access, and a first set of random access resources for transmission of random access requests by one or more UEs, the first set of random access resources including a first random access resource that is associated with a first transmission beam of the first set of transmission beams. The operations of 1605 may be performed according to the methods described herein. In some examples, aspects of the operations of 1605 may be performed by a SSB configuration manager as described with reference to FIGS. 9 through 12.

At 1610, the base station may receive a first random access request from the first UE using the first random access resource to initiate a connection establishment with the base station. The operations of 1610 may be performed according to the methods described herein. In some examples, aspects of the operations of 1610 may be performed by a random access manager as described with reference to FIGS. 9 through 12.

At 1615, the base station may transmit, during the connection establishment, configuration information that indicates a second set of transmission beams, where the second set of transmission beams includes each transmission beam of the first set of transmission beams and at least a second transmission beam in addition to the first set of transmission beams. The operations of 1615 may be performed according to the methods described herein. In some examples, aspects of the operations of 1615 may be performed by a SSB configuration manager as described with reference to FIGS. 9 through 12.

At 1620, the base station may map the second transmission beam to at least the first random access resource. The operations of 1620 may be performed according to the methods described herein. In some examples, aspects of the operations of 1620 may be performed by a RACH resource mapping component as described with reference to FIGS. 9 through 12.

Figure 17:
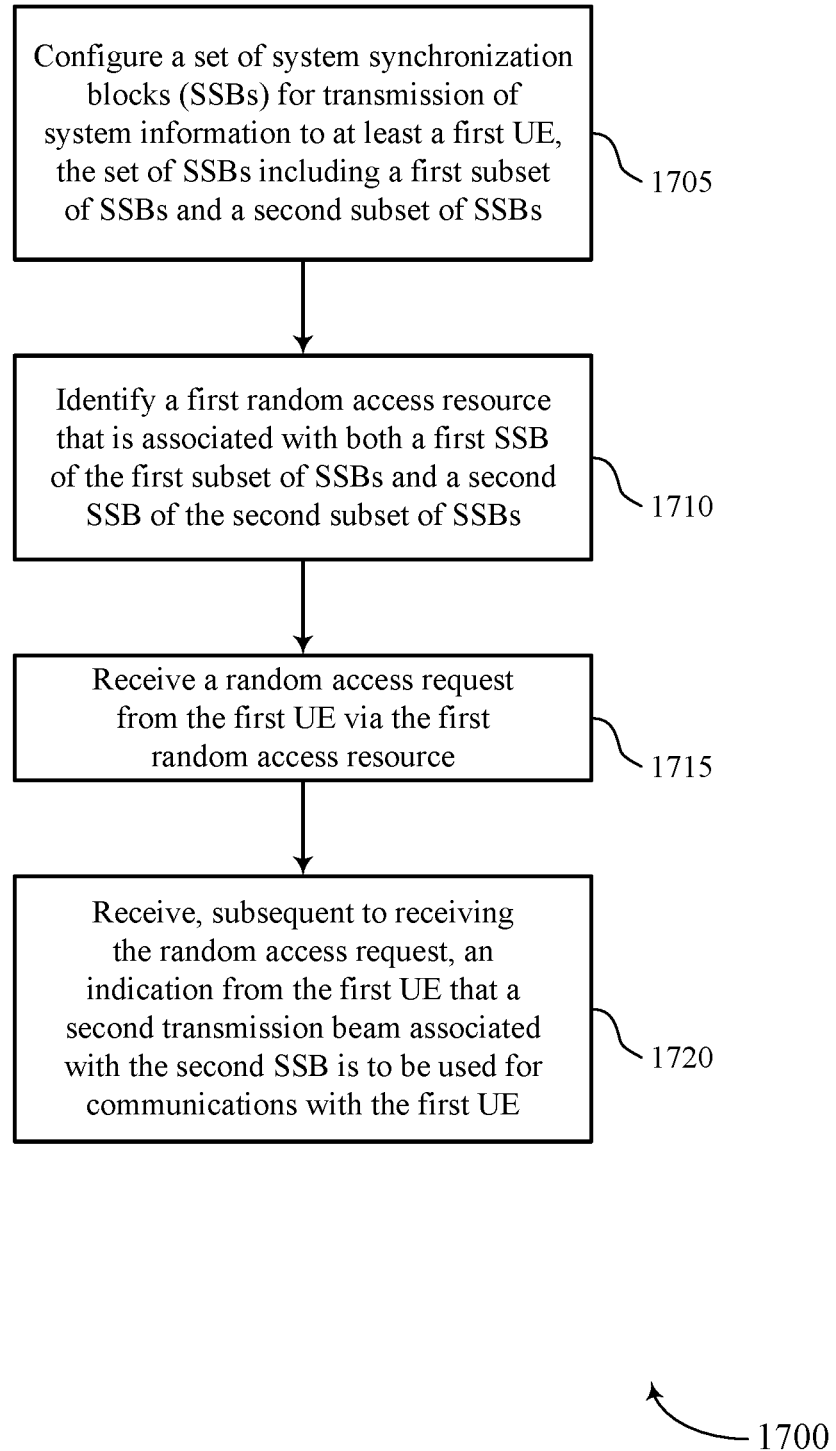

FIG. 17 shows a flowchart illustrating a method 1700 that supports random access techniques in beamformed wireless communications in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may configure a set of SSBs for transmission of system information to at least a first UE, the set of SSBs including a first subset of SSBs and a second subset of SSBs. The operations of 1705 may be performed according to the methods described herein. In some examples, aspects of the operations of 1705 may be performed by a SSB configuration manager as described with reference to FIGS. 9 through 12.

At 1710, the base station may identify a first random access resource that is associated with both a first SSB of the first subset of SSBs and a second SSB of the second subset of SSBs. The operations of 1710 may be performed according to the methods described herein. In some examples, aspects of the operations of 1710 may be performed by a RACH resource identification component as described with reference to FIGS. 9 through 12.

At 1715, the base station may receive a random access request from the first UE via the first random access resource. The operations of 1715 may be performed according to the methods described herein. In some examples, aspects of the operations of 1715 may be performed by a random access manager as described with reference to FIGS. 9 through 12.

At 1720, the base station may receive, subsequent to receiving the random access request, an indication from the first UE that a second transmission beam associated with the second SSB is to be used for communications with the first UE. The operations of 1720 may be performed according to the methods described herein. In some examples, aspects of the operations of 1720 may be performed by a beam identification component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined. Also note that aspects of the following examples may be combined with aspects of other embodiments, methods, or teachings provided in the present application.

Example 1 is a method of wireless communication that includes transmitting a first random access request to a base station using a first random access resource to initiate a connection establishment with the base station, the first random access resource associated with a first transmission beam of a first set of transmission beams for monitoring system information of the base station. Example 1 also includes receiving, based at least in part on the connection establishment, configuration information that indicates a second set of transmission beams, wherein the second set of transmission beams includes each transmission beam of the first set of transmission beams and at least an additional transmission beam. Example 1 also includes transmitting a second random access request to the base station based on the additional transmission beam, wherein the second random access request uses the first random access resource.

Example 2 includes Example 1 in addition to monitoring for a random access response to the second random access request on resources associated with each of the first transmission beam and the additional transmission beam. In Example 3, the method of any of examples 1-2 further includes transmitting a third random access message to the base station responsive to the random access response, the third random access message identifying the additional transmission beam is to be used for communications. In Example 4, the method of any of examples 1-3 further include receiving a fourth random access message from the base station via the additional transmission beam.

In Example 5, the method of any of examples 1-4 include identifying the first set of transmission beams to monitor for the system information of the base station, identifying a first set of random access resources for transmission of the first random access request to the base station, and mapping the additional transmission beam to at least the first random access resource.

In Example 6, identifying the first set of transmission beams in the method of any of examples 1-5 further includes receiving a RMSI transmission from the base station that indicates the first set of transmission beams, and wherein the first set of random access resources is determined based at least in part on the first set of transmission beams.

In Example 7, mapping the additional transmission beam to at least the first random access resource in the method of any of examples 1-6 further includes determining that the first transmission beam of the first set of transmission beams has a first set of beamforming parameters that are closer to a second set of beamforming parameters of the additional transmission beam than other transmission beams of the first set of transmission beams.

In Example 8, receiving the configuration information in the method of any of examples 1-7 further includes receiving additional system information indicating that the additional transmission beam is available for communications with the base station.

In Example 9, receiving the configuration information in the method of any of examples 1-8 further includes receiving an indication of a mapping between the first set of random access resources and the additional transmission beam. In Example 10, the method of any of examples 1-9 also includes wherein the indication of the mapping is received in one or more of a RMSI from the base station or a RRC signaling from the base station. In Example 11, the method of any of examples 1-10 includes wherein the indication of the mapping comprises an explicit indication of a correspondence between each additional transmission beam and a random access resource of the first set of random access resources, or an index value of a predefined indexed set of mappings.

Example 12 is a system or apparatus including means for implementing a method or realizing an apparatus as in any of examples 1-11.

Example 13 is a non-transitory computer-readable medium storing instructions executable by one or more processors to cause the one or more processors to implement a method as in any of examples 1-11.

Example 14 is a system including one or more processors and memory in electronic communication with the one or more processors storing instructions executable by the one or more processors to cause the system or apparatus to implement a method as in any of examples 1-11.

Example 15 is a method of wireless communication that includes identifying a set of SSBs to monitor for system information of a base station, the set of SSBs including a first subset of SSBs and a second subset of SSBs, identifying a first random access resource that is associated with both a first SSB of the first subset of SSBs and a second SSB of the second subset of SSBs, determining to communicate with the base station using a second transmission beam associated with the second SSB, transmitting a random access request to a base station using the first random access resource, and transmitting an indication to the base station that the second transmission beam is to be used for communications.

Example 16 includes Example 15 in addition to monitoring for a random access response to a second random access request on resources associated with each of a first transmission beam associated with the first random access resource and the second transmission beam.

In Example 17, transmitting the indication to the base station in the method of any of examples 15-16 further includes transmitting a second random access message to the base station responsive to the random access response, the second random access message identifying the second transmission beam is to be used for communications.

In Example 18, the method of any of examples 15-17 includes wherein the second random access message is a MSG3 transmission in a random access procedure. In Example 19, the method of any of examples 15-18 includes wherein the second random access message is a MSG3 transmission in a random access procedure. In Example 20, the method of any of examples 15-19 includes communicating with the base station via the second transmission beam.

Example 21 is a system or apparatus including means for implementing a method or realizing an apparatus as in any of examples 15-20.

Example 22 is a non-transitory computer-readable medium storing instructions executable by one or more processors to cause the one or more processors to implement a method as in any of examples 15-20.

Example 23 is a system including one or more processors and memory in electronic communication with the one or more processors storing instructions executable by the one or more processors to cause the system or apparatus to implement a method as in any of examples 15-20.

Example 24 is a method of wireless communication that includes configuring a first set of transmission beams for transmission of system information to at least a first UE for initial system access, and a first set of random access resources for transmission of random access requests by one or more UEs, the first set of random access resources including a first random access resource that is associated with a first transmission beam of the first set of transmission beams. Example 24 also includes receiving a first random access request from the first UE using the first random access resource to initiate a connection establishment with a base station and transmitting, during the connection establishment, configuration information that indicates a second set of transmission beams, wherein the second set of transmission beams includes each transmission beam of the first set of transmission beams and at least a second transmission beam in addition to the first set of transmission beams. Example 24 also includes mapping the second transmission beam to at least the first random access resource.

In Example 25, the method of Examples 24 further includes transmitting a SSB using each transmission beam of the first set of transmission beams, the SSB including RMSI that indicates the first set of transmission beams, and wherein the first set of random access resources is determined based at least in part on the first set of transmission beams.

In Example 26, transmitting the configuration information of Examples 24-25 includes transmitting additional system information to the first UE indicating one or more additional transmission beams, in addition to the first set of transmission beams, are available for communications. In Example 27, transmitting the configuration information in the method of any of examples 24-26 further includes transmitting an indication of a mapping between the first set of random access resources and the one or more additional transmission beams.

In Example 28, transmitting the configuration information in the method of any of Examples 24-27 includes transmitting an indication of a mapping between the first set of random access resources and the one or more additional transmission beams. In Example 29, the method of any of Examples 24-27 further includes wherein the indication of the mapping comprises an explicit indication of a correspondence between each of the additional transmission beams and a random access resource of the first set of random access resources, or an index value of a predefined indexed set of mappings.

In Example 30, the method of any of Examples 24-29 further includes receiving a second random access request from the first UE using the first random access resource.

In Example 31, the method of any of Examples 24-30 further includes transmitting a random access response to the second random access request using each of the first transmission beam and the second transmission beam.

In Example 32, the method of any of Examples 24-31 further includes receiving a third random access message from the first UE responsive to the random access response, the third random access message identifying the second transmission beam is to be used for communications.

In Example 33, the method of any of Examples 24-32 further includes transmitting a fourth random access message from the base station via the second transmission beam.

Example 34 is a system or apparatus including means for implementing a method or realizing an apparatus as in any of examples 24-33.

Example 35 is a non-transitory computer-readable medium storing instructions executable by one or more processors to cause the one or more processors to implement a method as in any of examples 24-33.

Example 36 is a system including one or more processors and memory in electronic communication with the one or more processors storing instructions executable by the one or more processors to cause the system or apparatus to implement a method as in any of examples 24-33.

Example 37 is a method of wireless communications that includes configuring a set of SSBs for transmission of system information to at least a first UE, the set of SSBs including a first subset of SSBs and a second subset of SSBs, identifying a first random access resource that is associated with both a first SSB of the first subset of SSBs and a second SSB of the second subset of SSBs, receiving a random access request from the first UE via the first random access resource, and receiving, subsequent to receiving the random access request, an indication from the first UE that a second transmission beam associated with the second SSB is to be used for communications with the first UE.

In Example 38, the method of Example 37 further includes transmitting a random access response to a second random access request each of a first transmission beam associated with the first SSB and the second transmission beam.

In Example 39, receiving the indication of any of Examples 37-38 includes receiving a second random access message from the first UE responsive to the random access response, the second random access message identifying that the second transmission beam is to be used for communications.

In Example 40, the method of any of Examples 37-39 further includes wherein the second random access message is a MSG3 transmission in a random access procedure. In Example 41, the method of any of Examples 37-40 includes communicating with the first UE via the second transmission beam.

Example 42 is a system or apparatus including means for implementing a method or realizing an apparatus as in any of examples 37-40.

Example 43 is a non-transitory computer-readable medium storing instructions executable by one or more processors to cause the one or more processors to implement a method as in any of examples 37-40.

Example 44 is a system including one or more processors and memory in electronic communication with the one or more processors storing instructions executable by the one or more processors to cause the system or apparatus to implement a method as in any of examples 37-40.

Aspects of these examples may be combined with aspects or embodiments disclosed in other implementations.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    transmitting a first random access request to a base station using a first random access resource to initiate a connection establishment with the base station, the first random access resource associated with a first transmission beam of a first set of transmission beams for monitoring system information of the base station;
    receiving, based at least in part on the connection establishment, configuration information that indicates a second set of transmission beams, wherein the second set of transmission beams includes each transmission beam of the first set of transmission beams and at least an additional transmission beam;
    transmitting a second random access request to the base station based on the additional transmission beam, wherein the second random access request uses the first random access resource, wherein the first random access request comprises a first MSG 1 transmission and the second random access request comprise a second MSG 1 transmission; and
    receiving one or both of a first random access response to the second random access request via the first transmission beam and a second random access response to the second random access request via the additional transmission beam.

2. The method of claim 1, further comprising:
    monitoring for the first random access response or the second random access response on resources associated with each of the first transmission beam and the additional transmission beam.

3. The method of claim 2, further comprising:
    transmitting a third random access message to the base station responsive to the first or second random access response, the third random access message identifying the additional transmission beam is to be used for communications.

4. The method of claim 3, further comprising:
receiving a fourth random access message from the base station via the additional transmission beam.

5. The method of claim 1, further comprising:
identifying the first set of transmission beams to monitor for the system information of the base station;
identifying a first set of random access resources for transmission of the first random access request to the base station; and
mapping the additional transmission beam to at least the first random access resource.

6. The method of claim 5, wherein the identifying the first set of transmission beams further comprises:
receiving a system information transmission from the base station that indicates the first set of transmission beams, and wherein the first set of random access resources is determined based at least in part on the first set of transmission beams.

7. The method of claim 5, wherein mapping the additional transmission beam to at least the first random access resource further comprises:
determining that the first transmission beam of the first set of transmission beams has a first set of beamforming parameters that are closer to a second set of beamforming parameters of the additional transmission beam than other transmission beams of the first set of transmission beams.

8. The method of claim 1, wherein the receiving the configuration information further comprises:
receiving additional system information indicating that the additional transmission beam is available for communications with the base station.

9. The method of claim 1, wherein the receiving the configuration information further comprises:
receiving an indication of a mapping between a first set of random access resources and the at least one additional transmission beam.

10. The method of claim 9, wherein the indication of the mapping is received in one or more of a remaining minimum system information (RMSI) from the base station or a radio resource control (RRC) signaling from the base station.

11. The method of claim 9, wherein the indication of the mapping comprises an explicit indication of a correspondence between each additional transmission beam and a random access resource of the first set of random access resources, or an index value of a predefined indexed set of mappings.

12. A method for wireless communication, comprising:
transmitting system information on a first set of transmission beams to at least a first user equipment (UE) for initial system access;
configuring a first set of random access resources for transmission of random access requests by one or more UEs, the first set of random access resources including a first random access resource that is associated with a first transmission beam of the first set of transmission beams;
receiving a first random access request from the first UE using the first random access resource to initiate a connection establishment with a base station;
transmitting, during the connection establishment, configuration information that indicates a second set of transmission beams, wherein the second set of transmission beams includes each transmission beam of the first set of transmission beams and at least a second transmission beam in addition to the first set of transmission beams;
mapping the second transmission beam to at least the first random access resource;
receiving a second random access request from the first UE using the first random access resource, wherein the first random access request comprises a first MSG 1 transmission and the second random access request comprise a second MSG 1 transmission;
transmitting one or both of a first random access response to the second random access request via the first transmission beam and a second random access response via to the second random access request the second transmission beam; and
receiving an indication that the second transmission beam is to be used for communications.

13. The method of claim 12, wherein transmitting the system information comprises:
transmitting a synchronization system block (SSB) using each transmission beam of the first set of transmission beams, the SSB including system information that indicates the first set of transmission beams, and wherein the first set of random access resources is determined based at least in part on the first set of transmission beams.

14. The method of claim 12, wherein transmitting the configuration information further comprises:
transmitting additional system information to the first UE indicating one or more additional transmission beams, in addition to the first set of transmission beams, are available for communications.

15. The method of claim 12, wherein transmitting the configuration information further comprises:
transmitting an indication of a mapping between the first set of random access resources and the one or more additional transmission beams.

16. The method of claim 15, wherein the indication of the mapping comprises an explicit indication of a correspondence between each of the additional transmission beams and a random access resource of the first set of random access resources, or an index value of a predefined indexed set of mappings.

17. The method of claim 12, further comprising:
transmitting the first random access response or the second random access response using each of the first transmission beam and the second transmission beam.

18. The method of claim 17, further comprising:
receiving a third random access message from the first UE responsive to the first or second random access response, wherein the third random access message comprises the indication that the second transmission beam is to be used for communications.

19. The method of claim 12, further comprising:
transmitting a fourth random access message from the base station via the second transmission beam.

20. The method of claim 12, wherein mapping the second transmission beam to at least the first random access resource further comprises:
determining that the first transmission beam of the first set of transmission beams has a first set of beamforming parameters that are closer to a second set of beamforming parameters of the second transmission beam than other transmission beams of the first set of transmission beams.

21. An apparatus comprising:
memory storing instructions; and one or more processors in electronic communication with the memory, the one or more processors configured to execute the instructions to cause the apparatus to:

transmit a first random access request to a base station using a first random access resource to initiate a connection establishment with the base station, the first random access resource associated with a first transmission beam of a first set of transmission beams for monitoring system information of the base station;

receive, based at least in part on the connection establishment, configuration information that indicates a second set of transmission beams, wherein the second set of transmission beams includes each transmission beam of the first set of transmission beams and at least an additional transmission beam;

transmit a second random access request to the base station based on the additional transmission beam, wherein the second random access request uses the first random access resource, wherein the first random access request comprises a first MSG 1 transmission and the second random access request comprise a second MSG 1 transmission; and receive one or both of a first random access response to the second random access request via the first transmission beam and a second random access response to the second random access request via the additional transmission beam.

22. The apparatus of claim 21, the one or more processors configured to further execute the instructions to cause the apparatus to:

monitor for the first random access response or the second random access response on resources associated with each of the first transmission beam and the additional transmission beam; and transmit a third random access message to the base station responsive to the random access response, the third random access message identifying the additional transmission beam is to be used for communications.

23. The apparatus of claim 22, the one or more processors configured to further execute the instructions to cause the apparatus to:

receive a fourth random access message from the base station via the additional transmission beam.

24. The apparatus of claim 21, the one or more processors configured to further execute the instructions to cause the apparatus to:

identify the first set of transmission beams to monitor for the system information of the base station;

identify a first set of random access resources for transmission of the first random access request to the base station; and map the additional transmission beam to at least the first random access resource.

25. The apparatus of claim 24, wherein the one or more processors cause the apparatus to map the additional transmission beam to at least the first random access resource by determining that the first transmission beam of the first set of transmission beams has a first set of beamforming parameters that are closer to a second set of beamforming parameters of the additional transmission beam than other transmission beams of the first set of transmission beams.

26. The apparatus of claim 21, wherein the one or more processors cause the apparatus to receive the configuration information by receiving additional system information indicating that the additional transmission beam is available for communications with the base station.

27. The apparatus of claim 21, wherein the one or more processors cause the apparatus to receive the configuration information by receiving an indication of a mapping between a first set of random access resources and the at least one additional transmission beam.

28. The apparatus of claim 21, wherein the one or more processors cause the apparatus to map the second transmission beam to at least the first random access resource by determining that the first transmission beam of the first set of transmission beams has a first set of beamforming parameters that are closer to a second set of beamforming parameters of the second transmission beam than other transmission beams of the first set of transmission beams.

29. An apparatus comprising:
memory storing instructions; and
one or more processors in electronic communication with the memory, the one or more processors configured to execute the instructions to cause the apparatus to:

transmit system information on a first set of transmission beams to at least a first user equipment (UE) for initial system access;

configure a first set of random access resources for transmission of random access requests by one or more UEs, the first set of random access resources including a first random access resource that is associated with a first transmission beam of the first set of transmission beams;

receive a first random access request from the first UE using the first random access resource to initiate a connection establishment with a base station;

transmit, during the connection establishment, configuration information that indicates a second set of transmission beams, wherein the second set of transmission beams includes each transmission beam of the first set of transmission beams and at least a second transmission beam in addition to the first set of transmission beams;

map the second transmission beam to at least the first random access resource;

receive a second random access request from the first UE using the first random access resource, wherein the first random access request comprises a first MSG 1 transmission and the second random access request comprise a second MSG 1 transmission;

transmit one or both of a first random access response to the second random access request via the first transmission beam and a second random access response via to the second random access request the second transmission beam; and receive an indication that the second transmission beam is to be used for communications.

30. The apparatus of claim 29, the one or more processors configured to further execute the instructions to cause the apparatus to:

transmit the first random access response or the second random access response using each of the first transmission beam and the second transmission beam; and receive a third random access message from the first UE responsive to the first random access response or the second random access response, wherein the third random access message comprises the indication that the second transmission beam is to be used for communications.

* * * * *